(12) United States Patent  (10) Patent No.: US 7,954,656 B1
Cuzzocrea  (45) Date of Patent: Jun. 7, 2011

(54) DISPLAY FIXTURE ANCHOR SYSTEMS

(76) Inventor: Lawrence A. Cuzzocrea, Phoenix, AZ (US)

( * ) Notice: Subject to any disclaimer, the term of this patent is extended or adjusted under 35 U.S.C. 154(b) by 1215 days.

(21) Appl. No.: 10/754,344

(22) Filed: Jan. 8, 2004

Related U.S. Application Data

(60) Provisional application No. 60/439,414, filed on Jan. 8, 2003.

(51) Int. Cl.
A47B 43/00 (2006.01)
(52) U.S. Cl. .................................................. 211/189
(58) Field of Classification Search .............. 211/189, 211/181.1, 194, 106, 187, 87.01, 190, 175; 248/220.41, 117.7; 108/108; D6/567
See application file for complete search history.

(56) References Cited

U.S. PATENT DOCUMENTS

| | | | | |
|---|---|---|---|---|
| 3,082,986 A | * | 3/1963 | Campanizzi | 248/117.7 |
| 3,294,351 A | * | 12/1966 | Rollins, Jr. | 248/243 |
| 3,417,872 A | * | 12/1968 | Close | 211/59.1 |
| 3,486,632 A | * | 12/1969 | Balch | 248/221.11 |
| 3,490,600 A | * | 1/1970 | Reed et al. | 248/220.41 |
| 3,971,477 A | * | 7/1976 | Bruderly et al. | 211/189 |
| 4,068,855 A | * | 1/1978 | Hackett | 280/79.3 |
| 4,199,069 A | * | 4/1980 | Talarico | 211/194 |
| 4,401,222 A | * | 8/1983 | Kulikowski et al. | 211/94.01 |
| 4,591,057 A | * | 5/1986 | Garfinkle | 211/59.1 |
| 4,934,645 A | * | 6/1990 | Breslow | 248/242 |
| 5,133,463 A | * | 7/1992 | Merl | 211/190 |
| 5,373,793 A | * | 12/1994 | Crossman | 108/42 |
| 5,547,088 A | * | 8/1996 | Belokin et al. | 211/87.01 |
| 5,573,124 A | * | 11/1996 | Frost | 211/181.1 |
| 5,738,019 A | * | 4/1998 | Parker | 108/108 |
| 5,769,248 A | * | 6/1998 | Johnson | 211/106 |
| 5,918,750 A | * | 7/1999 | Jackson | 211/189 |
| 6,206,212 B1 | * | 3/2001 | Loew | 211/189 |
| 6,234,330 B1 | * | 5/2001 | Gray | 211/106 |
| 6,302,282 B1 | * | 10/2001 | Gay et al. | 211/153 |
| D459,626 S | * | 7/2002 | Shea | D6/567 |
| 6,457,595 B1 | * | 10/2002 | Pritchard et al. | 211/189 |
| D465,372 S | * | 11/2002 | Shea | D6/567 |
| D466,352 S | * | 12/2002 | Shea | D6/567 |
| 6,659,294 B1 | * | 12/2003 | Simard | 211/181.1 |
| 7,128,223 B1 | * | 10/2006 | Sarnoff et al. | 211/90.03 |
| 7,387,213 B1 | * | 6/2008 | Smalley | 211/106 |
| 2002/0027115 A1 | * | 3/2002 | Gay et al. | 211/187 |

* cited by examiner

Primary Examiner — Sarah Purol
(74) Attorney, Agent, or Firm — Booth Udall, PLC

(57) ABSTRACT

A display fixture anchor system including a first panel having integral connectors and threaded and unthreaded apertures. The first panel is adapted to abut and fasten to at least one type of display fixture and to also connect via the integral connectors to a connection element, such as a slotted standard, to a particular type of store gondola. The system includes a first panel used as the head of a bolt for engaging vertical webs such as wire grids on display fixtures, in conjunction with a second panel used as an adaptable washer having multiple apertures. The system also includes a first panel used as a channel for receiving a tubular perimeter frame of a display fixture. Custom hybrid use of a first panel is also included. Methods of use and manufacture are provided within the system.

13 Claims, 10 Drawing Sheets

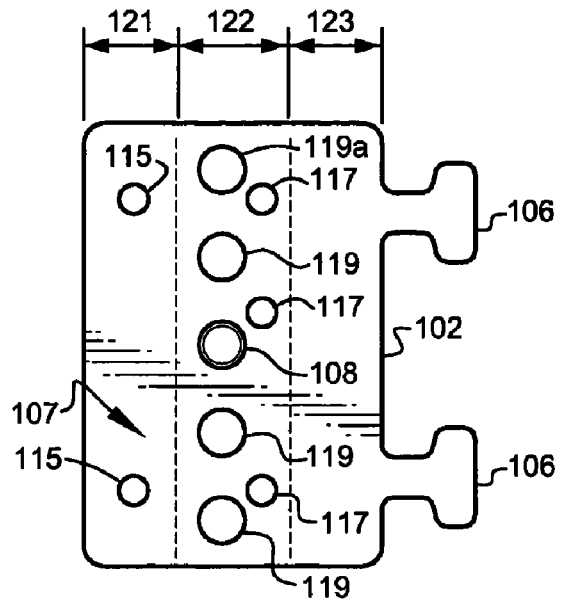
FIG. 5
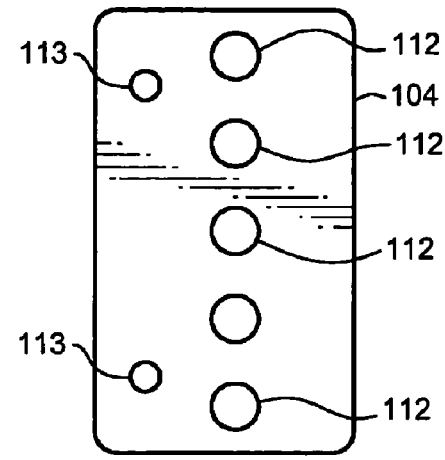
FIG. 6
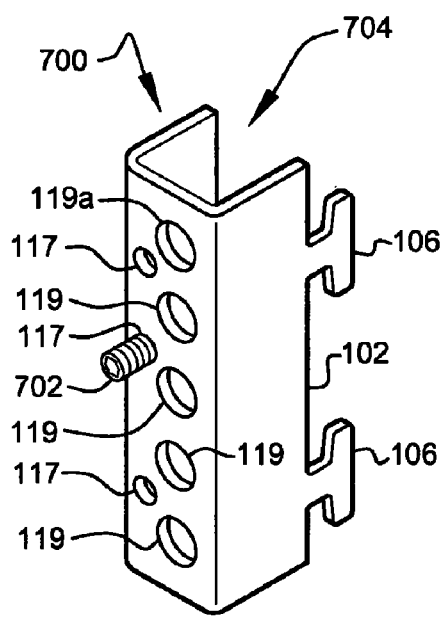
FIG. 7
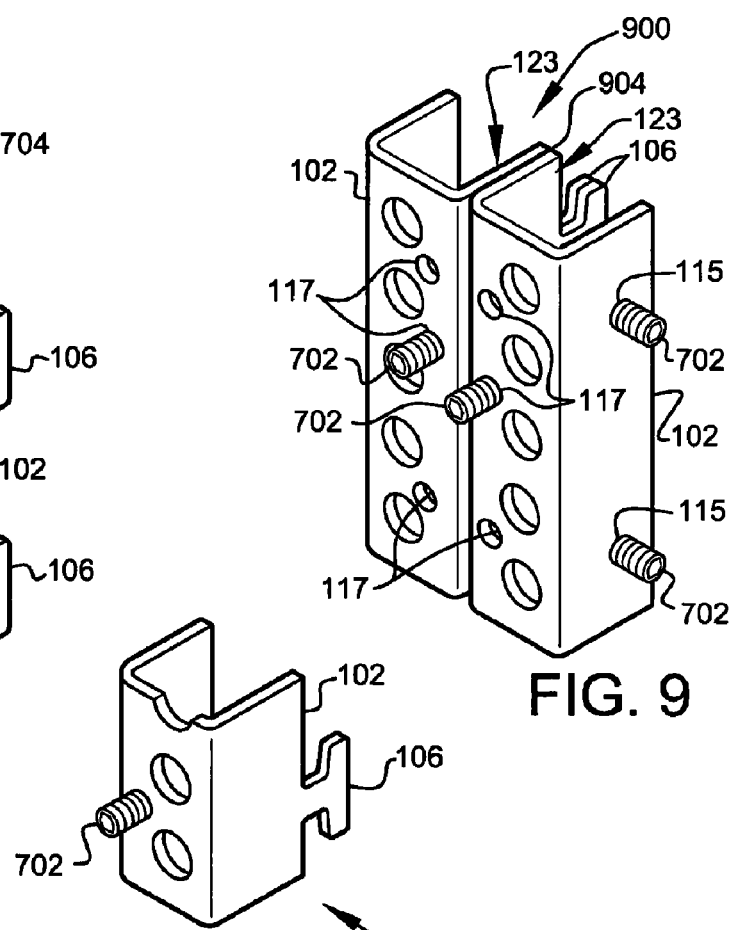
FIG. 8
FIG. 9

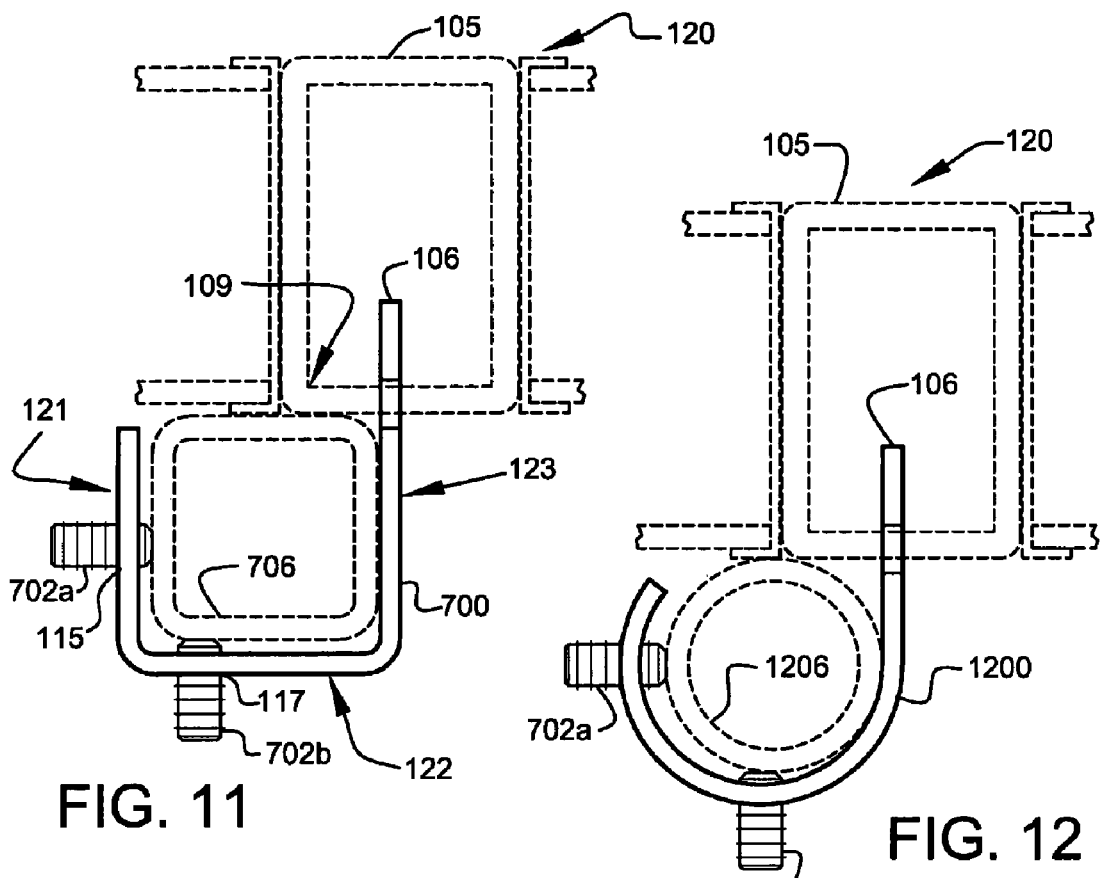
FIG. 11
FIG. 12
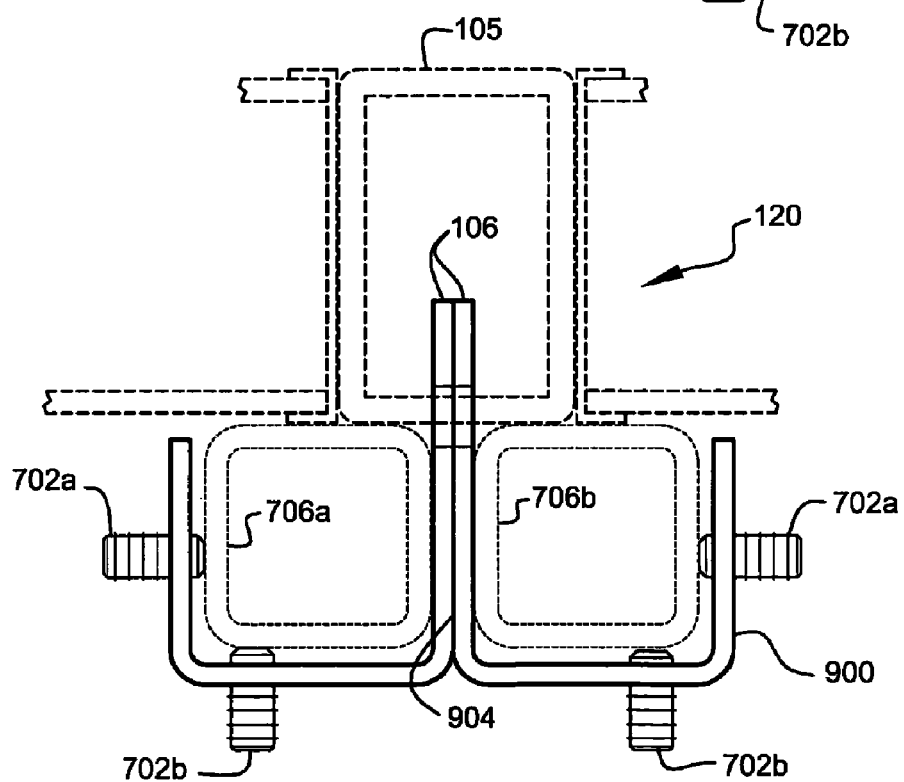
FIG. 13

DISPLAY FIXTURE ANCHOR SYSTEMS

REFERENCES TO RELATED APPLICATIONS

The present application is related to and claims priority from prior provisional application Ser. No. 60/439,414, filed Jan. 8, 2003, entitled "DISPLAY FIXTURE ANCHOR SYSTEM", the contents of which are incorporated herein by this reference and are not admitted to be prior art with respect to the present invention by the mention in this cross-reference section.

BACKGROUND

This invention relates to a display fixture anchor system. More particularly, this invention relates to a display fixture anchor system for improved support and anchoring of various display fixtures to various predetermined free-standing store-shelving systems, such as store gondolas, typically found in convenience stores, grocery stores, and other retail establishments (for example, store gondolas having a base section and vertical upright slotted standards as manufactured by Lazier®, Streeter®, etc.).

Display fixtures of various types or designs are used to enhance product display either as free-standing displays or non-free-standing displays that must be proximate other fixtures (as a secondary display fixture). The display fixture industry lacks an inexpensive, easily installed, and handy display fixture anchor system for securely anchoring a wide variety of types of display fixtures when such display fixtures are connected to various predetermined store gondolas. Such secured anchoring is preferred in order to prevent tipping of the secondary display fixture (which may injure customers) or theft of the display fixture and the products displayed thereon.

Accordingly, a need exists for an inexpensive, simple-to-install, effective display fixture anchor, which prevents inadvertent overturning or unauthorized removal of secondary display fixtures when attached to a store gondola. Further, a need exists for such a display fixture anchoring system utilizing predetermined free-standing store-shelving systems, such as store gondolas, as the primary support to which the display fixture is anchored. Further, a need exists for such a display fixture anchoring system that can connect two or more display fixtures together for mutual support.

OBJECTS AND FEATURES OF THE INVENTION

A primary object and feature of the present invention is to provide a display fixture anchor system that solves the problems and meets the needs described above.

It is a further primary object and feature of the present invention to provide such a system compatible with various display fixtures having a wire and grid structure.

It is a further primary object and feature of the present invention to provide such a system compatible with display fixtures having a tubular perimeter frame.

It is a further object and feature of the present invention to provide linking of a plurality of such display fixtures to provide safe and efficient use of merchandising space.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a display fixture anchor system for connecting each of a plurality of types of display fixtures to at least one type of store gondola, each such display fixture of such plurality of types of display fixtures having at least one substantially vertical portion, the display fixture anchor system comprising: a first abutter panel structured and arranged to at least partially abut such substantially vertical portion of at least one type of display fixture of such plurality of types of display fixtures; a first fastener structured and arranged to fasten such first abutter panel to such substantially vertical portion of such at least one type of display fixture; and at least one first connector operable to connect such first abutter panel to one store gondola of such at least one type of store gondola.

Moreover, it provides such a display fixture anchor system, further comprising a display fixture of such at least one type of display fixture having such first abutter panel abutted thereto.

Additionally, it provides such a display fixture anchor system, further comprising such one store gondola. Also, it provides such a display fixture anchor system, wherein such first abutter panel comprises: a first plurality of spaced-apart first apertures through such first abutter panel; and at least one first threaded bore through such first abutter panel.

In addition, it provides such a display fixture anchor system, wherein such substantially vertical portion comprises a substantially vertical web portion having at least one opening, such first fastener comprising an extension affixed to such first abutter panel and adapted to extend through such at least one opening of such substantially vertical web portion; receive a second abutter panel structured and arranged to abut an adjacent opposing side of such substantially vertical web portion; and receive a securer operable to secure first and second abutters to such substantially vertical web portion. And, it provides such a display fixture anchor system, wherein such second abutter panel further comprises a plurality of second unthreaded apertures.

Further, it provides such a display fixture anchor system, wherein such extension comprises an orthogonal extension affixed to an abutting surface of such first abutter panel. Even further, it provides such a display fixture anchor system, wherein such at least one vertical web portion of such display fixture comprises a plurality of structural elements, such first abutter panel structured and arranged to simultaneously abut at least two such structural elements. Moreover, it provides such a display fixture anchor system, wherein such second abutter panel further comprises at least one second aperture adapted to receive such orthogonal extension. Additionally, it provides such a display fixture anchor system, wherein such at least one second aperture comprises a plurality of substantially equally spaced-apart second apertures for aligning at least one second aperture of such plurality of substantially equally spaced-apart second apertures with at least one first aperture to receive at least one second fastener for fastening such first abutter panel to such second abutter panel. Also, it provides such a display fixture anchor system, wherein such second abutter panel further comprises at least one second threaded bore alignable to such at least one first threaded bore and operable to receive a third fastener there through.

In addition, it provides such a display fixture anchor system, wherein such at least one substantially vertical portion is a tubular perimeter frame portion, such first abutter panel further comprising a channel structured and arranged to receive such tubular perimeter frame portion, and wherein such first abutter panel has at least one outer wall and further has a selected length. And, it provides such a display fixture anchor system, further comprising an attachment adapted to mutually and removably attach first and second display fixtures, such attachment comprising first and second such first abutter panels affixed along at least a portion of such at least one outer wall of each such first and second abutter panels. Further, it provides such a display fixture anchor system, further comprising connectors adapted to simultaneously connect such first and second display fixtures to such one store gondola.

Even further, it provides such a display fixture anchor system, wherein such at least one threaded bore comprises at least two threaded bores disposed in a fastening orientation in such first abutter panel. Moreover, it provides such a display fixture anchor system, wherein such fastening orientation comprises a mutually orthogonal orientation. Additionally, it provides such a display fixture anchor system, wherein such first fastener comprises at least one set screw structured and arranged to be threaded through such threaded bore to fasten such first abutter panel to such tubular perimeter frame.

In accordance with another preferred embodiment hereof, this invention provides a display fixture anchor system for connecting each of a plurality of types of display fixtures to a store gondola, the system comprising the steps of: forming a first panel having a left portion, a right portion, and a middle portion disposed between such left portion and wherein at least one of such right portion, such left portion and such middle portion have extensions structured and arranged to connect to such store gondola; forming a plurality of first substantially equally spaced-apart apertures in such middle portion of such first panel; and forming at least one threaded bore such left portion of such first panel. Also, it provides such a display fixture anchor system, further comprising the step of forming at least one threaded bore in the middle portion of such first panel.

In addition, it provides such a display fixture anchor system, further comprising the steps of: forming a second panel; and forming a plurality of second substantially equally spaced-apart apertures in a middle portion of such second panel. And, it provides such a display fixture anchor system, further comprising the step of forming at least one of second threaded bore in a left portion of such second panel. Further, it provides such a display fixture anchor system, further comprising the step of forming at least one stud extending orthogonally from such first panel, wherein such stud is formed to be received through at least one second substantially equally spaced-apart aperture of such plurality of such second substantially equally spaced-apart apertures of such second panel. Even further, it provides such a display fixture anchor system, further comprising the step of providing a securer adapted to interoperate with such stud.

Moreover, it provides such a display fixture anchor system, further comprising the step of bending such first panel. Additionally, it provides such a display fixture anchor system, wherein the step of bending such first panel comprises the step of bending the right portion of such first panel substantially orthogonal to such middle portion of such first panel. Also, it provides such a display fixture anchor system, wherein the step of bending such first panel comprises the step of bending such left portion of such first panel substantially orthogonal to such middle portion of such first panel.

In accordance with another preferred embodiment hereof, this invention provides a display fixture anchor system produced by the steps.

In accordance with another preferred embodiment hereof, this invention provides a display fixture anchor system for attaching each of a plurality of types of display fixtures to at least one type of store gondola, the display fixture anchor system comprising the combination of: a bolt having a head structured and arranged to be capable of interlocking with such at least one store gondola; and a washer having a plurality of apertures each configured to receive such bolt.

In accordance with another preferred embodiment hereof, this invention provides a display fixture anchor system, comprising a bolt having a head configured to interlock with at least one store gondola.

In accordance with another preferred embodiment hereof, this invention provides a display fixture anchor system, comprising a bolt having a head configured to interlock with at least one predetermined apparatus. In addition, it provides such a display fixture anchor system, wherein such head configured to interlock with such at least one predetermined apparatus comprises a head configured to interlock at a peripheral surface of such head to such at least one predetermined apparatus.

In accordance with another preferred embodiment hereof, this invention provides a display fixture anchor system having at least one first panel portion further having integral connectors adapted to connect to at least one type of store gondola and at least one first fastener, the display fixture anchor system comprising the steps of: at least partially abutting such at least one first panel portion in a substantially vertical position to at least one vertical portion of at least one display fixture; aligning such at least one first panel to at least one connection element of such store gondola; connecting such at least one display fixture to such store gondola using such integral connectors of such at least one such first panel; and fastening such at least one first panel to such at least one vertical portion of such display fixture.

In accordance with another preferred embodiment hereof, this invention provides a display fixture anchor system for connecting each of a plurality of types of display fixtures to at least one type of store gondola, each such display fixture of such plurality of types of display fixtures having at least one substantially vertical portion, the display fixture anchor system comprising: first abutter means for at least partially abutting such substantially vertical portion of such at least one type of display fixture of such plurality of types of display fixtures; first fastener means for fastening such first abutter means to such substantially vertical portion of such at least one type of display fixture; and at least one first connection means for connecting such first abutter means to one store gondola of such at least one type of store gondola. And, it provides such a display fixture anchor system, wherein such first abutter means comprises: a first plurality of spaced-apart first aperture means for providing apertures through such first abutter means; and at least one first threaded bore means for providing a threaded bore through such first abutter means.

Further, it provides such a display fixture anchor system, wherein such substantially vertical portion comprises a substantially vertical web portion having at least one opening, such first fastening means comprising extension means affixed to such first abutter means for extending through such at least one opening of such substantially vertical web portion; receiving second abutter means for abutting an adjacent opposing side of such substantially vertical web portion; and receiving securing means for securing first and second abutter means to such substantially vertical web portion. Even further, it provides such a display fixture anchor system, wherein such extension means affixed to such first abutter means comprises extension means affixed orthogonally to an abutting surface of such first abutter means.

Even further, it provides such a display fixture anchor system, wherein such at least one vertical web portion of such display fixture comprises a plurality of structural elements, such first abutter means comprising panel means for simultaneously abutting at least two such structural elements. Even further, it provides such a display fixture anchor system, wherein such second abutter means further comprises at least one second aperture means for receiving such extension means. Even further, it provides such a display fixture anchor system, wherein such at least one second aperture means comprises a plurality of substantially equally spaced-apart second aperture means for aligning at least one second aperture means of such plurality of substantially equally spaced-apart second aperture means with at least one first aperture means to receive second fastener means for fastening such first abutter means to such second abutter means. Even further, it provides such a display fixture anchor system, wherein such second abutter means further comprises at least one second threaded bore means for aligning to such first threaded bore means to receive third fastener means for fastening such first abutter means to such second abutter means.

Even further, it provides such a display fixture anchor system, wherein such at least one substantially vertical portion is a tubular perimeter frame portion, such first abutter means further comprising channel means for receiving such tubular perimeter frame portion, wherein such channel means has at least one outer wall and further having a selected length. Even further, it provides such a display fixture anchor system, further comprising attachment means for mutually removably attaching first and second display fixtures, such attachment means including first and second such first abutter means affixed along at least a portion of such at least one outer wall of each such first and second first abutter means. Even further, it provides such a display fixture anchor system, further comprising connection means for simultaneously connecting such first and second display fixtures to at least one store gondola. Even further, it provides such a display fixture anchor system, wherein such at least one threaded bore means comprises at least two threaded bore means for receiving such fastener means mutually disposed in a fastening orientation in such first abutter means. Even further, it provides such a display fixture anchor system, wherein such fastening orientation comprises a mutually orthogonal orientation. Even further, it provides such a display fixture anchor system, wherein such first fastener means comprises set screw means for threading through such threaded bore means to fasten such first abutter means to such tubular perimeter frame.

Even further, it provides such a display fixture anchor system, wherein such at least one substantially vertical portion is a tubular perimeter frame portion, such first abutter means further comprising a single substantially right-angle bend between a right-hand portion of such first abutter means and the middle and left portions of such first abutter means. Even further, it provides such a display fixture anchor system, wherein such first fastener means comprises set screw means for threading through such threaded bore means to fasten such first abutter means to such tubular perimeter frame. Even further, it provides an optional second bend between such middle portion and such left portion wherein the second bend is oppositely directed from the single bend.

BRIEF DESCRIPTION OF THE DRAWINGS

FIG. 5 is a side elevation view illustrating a first panel of a display fixture anchor system of FIG. 1B, according to a preferred embodiment of the present invention.

FIG. 6 is a side elevation view illustrating a second panel of the display fixture anchor system of FIG. 1B, according to a preferred embodiment of the present invention.

FIG. 7 is a perspective view illustrating a display fixture anchor system formed from a first panel of FIG. 5, according to a preferred embodiment of the present invention.

FIG. 8 is a perspective view illustrating a display fixture anchor system, according to a preferred embodiment of the present invention.

FIG. 9 is a perspective view illustrating a display fixture anchor system, according to a preferred embodiment of the present invention.

FIG. 11 is a cross-sectional view of section 11-11 of FIG. 10 illustrating a display fixture anchor system of FIG. 7 according to a preferred embodiment of the present invention.

FIG. 12 is a cross-sectional view similar to that of section 11-11 of FIG. 10 illustrating a display fixture anchor system according to a preferred embodiment of the present invention.

FIG. 13 is a cross-sectional view similar to that of section 11-11 of FIG. 10 illustrating a display fixture anchor system of FIG. 9 according to a preferred embodiment of the present invention.

DETAILED DESCRIPTION OF BEST MODES
AND PREFERRED EMBODIMENTS OF THE
PRESENT INVENTION

Figure 1A:
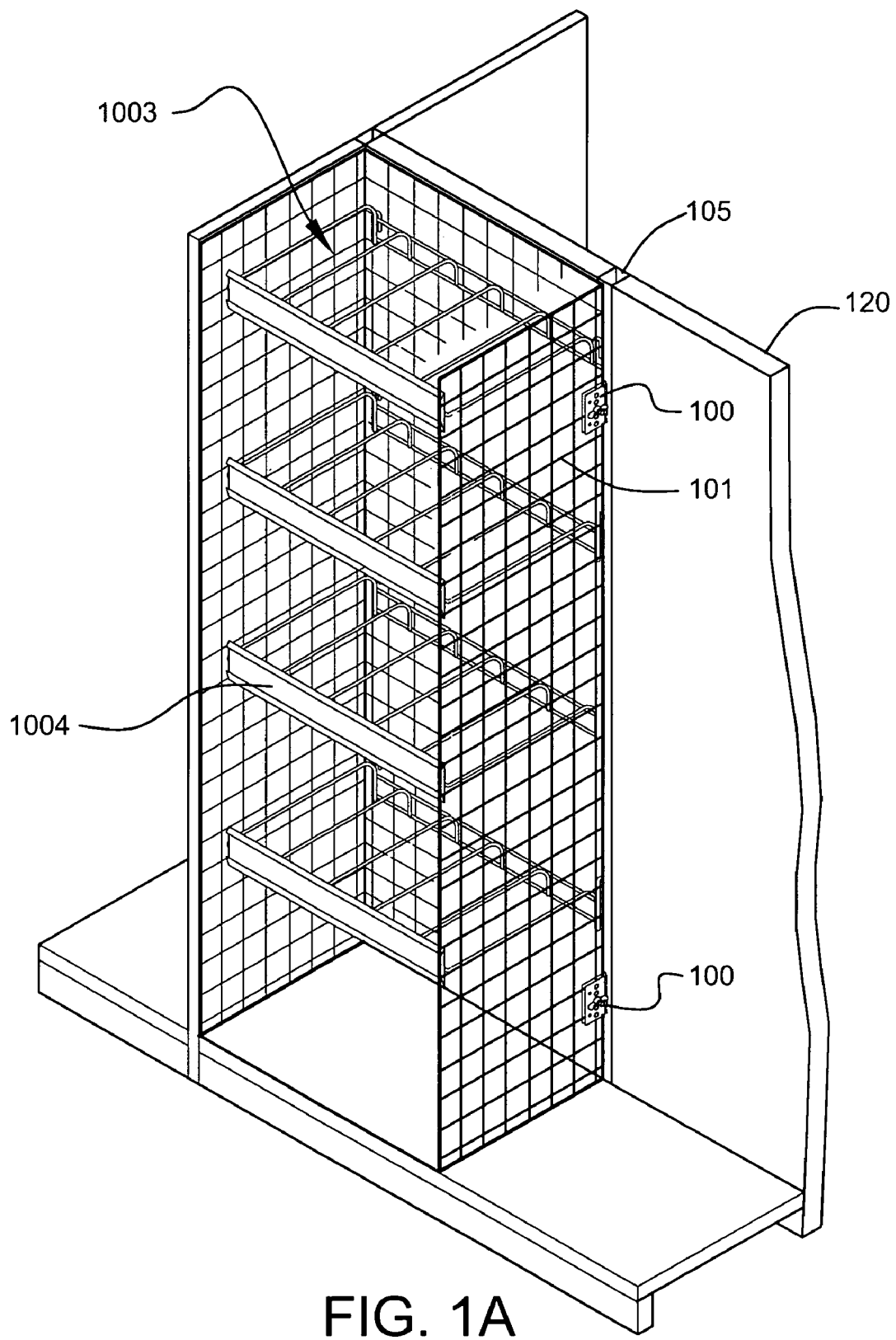
FIG. 1A is a perspective view illustrating a display fixture anchor system connecting a display fixture to a store gondola according to a preferred embodiment of the present invention.

FIG. 1A is a perspective view illustrating a display fixture anchor system 100 anchoring a display fixture 1003 to a predetermined store-shelving fixture, or store gondola 120, according to a preferred embodiment of the present invention. Display fixture anchor system 100 is preferably removably fastened to display fixture 1003 and removably connected to store gondola 120 via a connection element, or slotted standard 105, as shown. Such connection elements typically vary among manufacturers of store gondolas 120. Display fixture anchor system 100 may be positioned on substantially vertical web 101 of display fixture 1003 to removably connect, or interlock, with any pair of available slots 107 (see FIG. 1B) in slotted standard 105, providing flexibility and convenience of installation. In another embodiment, display fixture anchor system 100 preferably includes the display fixture 1003 and may further include store gondola 120 (at least embodying herein at least one display fixture; and at least embodying herein one store gondola). Upon reading the teachings of this specification, those with ordinary skill in the art will now understand that, under appropriate circumstances, considering such issues as various store gondola 120 and slotted standard 105 designs, economics, user preference, etc., various particularly adapted display fixture anchor systems 100, including those further described below, combinations thereof, etc., may suffice.

Figure 1B:
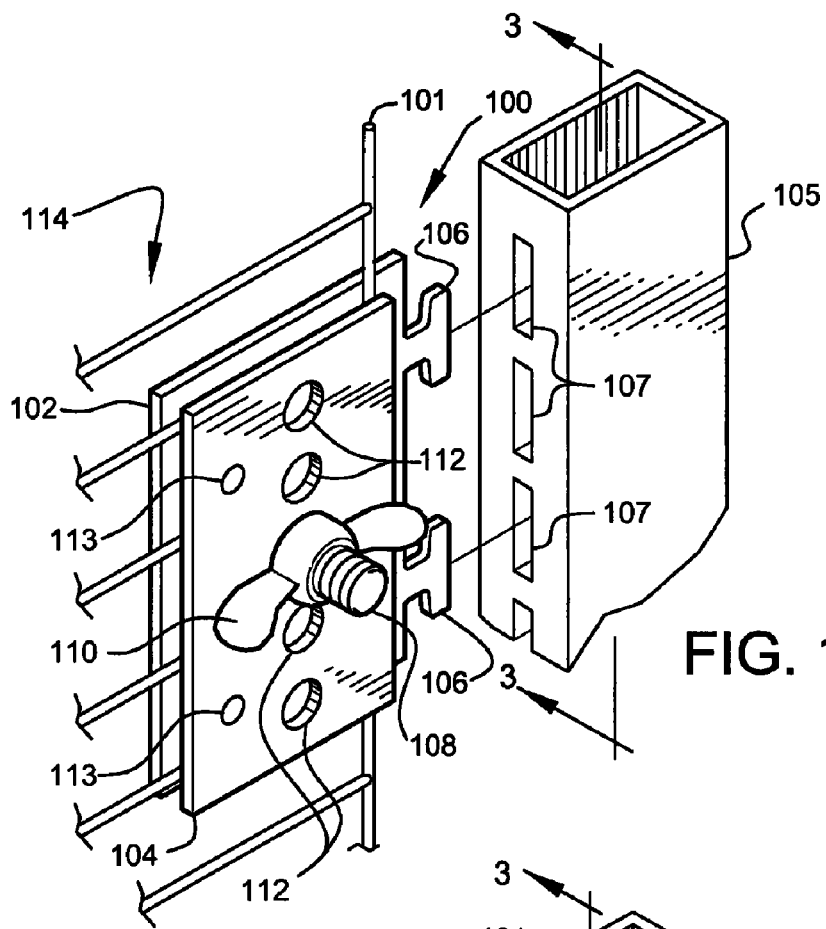
FIG. 1B is a perspective view illustrating details of the display fixture anchor system of FIG. 1A according to a preferred embodiment of the present invention.

FIG. 1B is a perspective view of a display fixture anchor system 100 fastened to a substantially vertical web portion, illustrated as a wire grid portion 101 of a display fixture 1003 and aligned to slotted standard 105 of a store gondola 120, according to a preferred embodiment of the present invention, as shown.

Preferably, display fixture anchor system 100 comprises a substantially rigid, generally planar, substantially rectangular first abutter panel, or first panel 102, as shown (at least embodying herein first abutter means for at least partially abutting said substantially vertical portion of said at least one type of display fixture of said plurality of types of display fixtures; and at least embodying herein a first abutter panel structured and arranged to at least partially abut said substantially vertical portion of at least one type of display fixture of said plurality of types of display fixtures; and at least embodying herein a head structured and arranged to be capable of interlocking with said store gondola; and at least embodying herein a head configured to interlock with at least one store gondola; and at least embodying herein a head structured and arranged to be capable of interlocking with at least one store gondola; and at least embodying herein a head configured to interlock with at least one predetermined apparatus), and second abutter panel (or second panel) 104 (at least embodying herein second abutter means for abutting an adjacent opposing side of said substantially vertical web portion; and at least embodying herein a second abutter panel structured and arranged to abut an adjacent opposing side of said substantially vertical web portion; and at least embodying herein a washer having a plurality of apertures).

Preferably, first panel 102 comprises at least one, more preferably two, "T"-shaped tab(s) 106 (at least embodying herein one first connection means for connecting said first abutter means to one store gondola of said at least one type of store gondola; and at least embodying herein at least one first connector operable to connect said first abutter panel to one said store gondola of said at least one type of store gondola), adapted to removably engage, or to removably connect, or to removably interlock with, a standard 105 of a store gondola 120 (such as systems produced by Lozier products, Omaha, Nebr.). Upon reading the teachings of this specification, those with ordinary skill in the art will now understand that, under appropriate circumstances, considering such issues as slotted standard 105 configuration, gondola 120 design, economics, user preference, etc., other tabs 106, such as those having various adaptive shapes and sizes, may suffice.

Preferably, first panel 102 further comprises an extension, such as the threaded rod 108 fixed to first panel 102, as shown (said threaded rod 108 at least embodying herein extension means for extending through an opening of said substantially vertical web portion and for receiving said fastening means; and at least embodying herein an orthogonal extension to said first abutter panel; and at least embodying herein a bolt having a head structured and arranged to be capable of interlocking with said predetermined store-shelving system; and at least embodying herein a bolt; and at least embodying herein a bolt having a head configured to interlock with a predetermined store-shelving system).

Preferably, a securer, exemplified as a wing nut 110, is used to tighten and clamp second panel 104 and first panel 102 to substantially vertical web portion 101 of a display fixture 1003, by threading onto the threaded rod 108, as shown (said wing nut 110 at least embodying herein securing means for securing first and second abutter means to said substantially vertical web portion; and at least embodying herein securer operable to secure first and second abutters to said substantially vertical web portion). Preferably, second panel 104 comprises a plurality of unthreaded apertures 112 adapted to receive threaded rod 108, as shown (said unthreaded apertures 112 at least embodying herein one second aperture means for receiving said extension means; and at least embodying herein at least one second aperture structured and arranged to receive said orthogonal extension). More preferably, second panel 104 comprises a plurality of unthreaded apertures 112, preferably in a row and, most preferably, second panel 104 comprises a plurality of unthreaded apertures 112, preferably in a row having substantially equal spacing between said unthreaded apertures 112, as shown (at least embodying herein a plurality of substantially equally spaced-apart second apertures). Upon reading the teachings of this specification, those with ordinary skill in the art will now understand that, under appropriate circumstances, considering such issues as display fixture 1003 configuration, shape of the substantially vertical web portion 101, economics, user preference, etc., other second panels 104, such as those having various adaptive shapes and sizes, various patterns and spacings of unthreaded apertures 112 adapted to particular display fixtures 1003, etc., may suffice.

Preferably, first panel 102 and second panel 104 are comprised of painted steel. Upon reading the teachings of this specification, those with ordinary skill in the art will now understand that, under appropriate circumstances, considering such issues as strength and durability of materials, changes in the retail environment, variations in gondola 120 design, display fixture 1003 design, economics, and user preference, etc., other materials, such as aluminum, particular metal alloys, epoxy-based composites, etc., may suffice.

Figure 2:
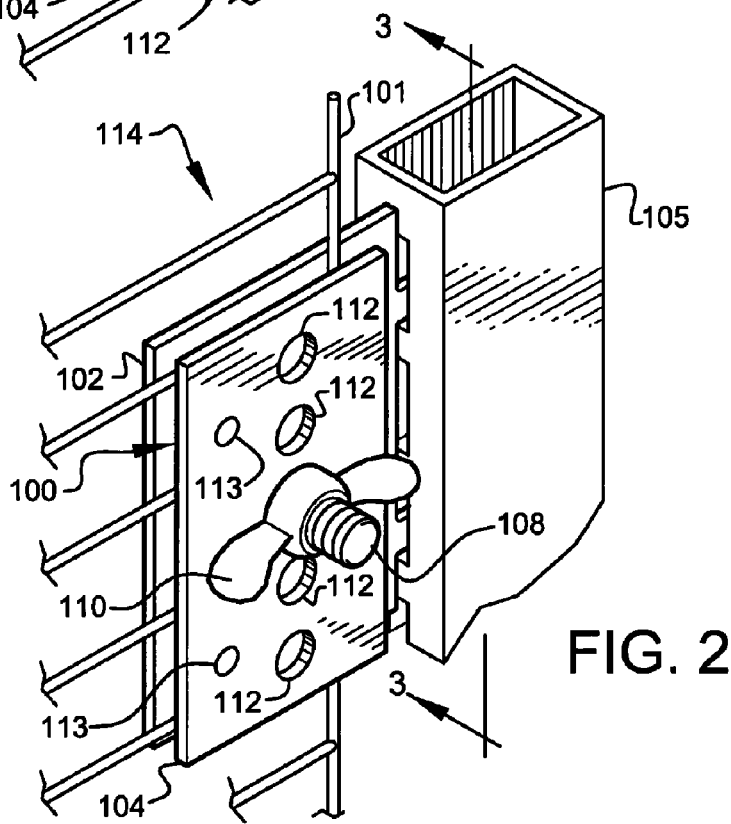
FIG. 2 is a perspective view illustrating a display fixture anchor system of FIG. 1B connected to a standard of the store gondola of FIG. 1A according to a preferred embodiment of the present invention.

FIG. 2 is a perspective view of the first display fixture anchor system 100 of FIG. 1B interlocked to, or connected to, or engaged with, the slotted standard 105 of store gondola 120. Preferably, tabs 106 limit downward and outward motions of display fixture 1003 by interlocking with slotted standard 105 and thereby prevent tipping (outward and downward motion) of display fixture 1003 (at least at least embodying herein one first connection means for connecting said first abutter means to one store gondola of said at least one type of store gondola; and at least at least embodying herein at least one first connector operable to connect said first abutter panel to one store gondola of said at least one type of store gondola; and at least at least embodying herein a bolt having a head configured to interlock with at least one store gondola; and at least at least embodying herein a bolt having a head structured and arranged to be capable of interlocking with said at least one store gondola; and a bolt having a head configured to interlock with at least one predetermined apparatus). Slotted standards 105 of various designs are found in respective various store gondolas 120 and it is preferable to adapt tabs 106 to the various designs of slotted standards 105 or other connection elements. For example, some slots are one-inch slots on two-inch centers, however other slots may be one-half-inch-long slots on one-inch centers. Furthermore, some connection elements are adapted to receive connectors other than tabs 106 or in addition to tabs 106. Those connectors illustrated as tabs 106 are merely illustrative of one preferred manner to interlock the first display fixture anchor system 100 with the slotted standard 105 of the store gondola 120. First panels 102, intended for use with other slotted standard 105 designs, preferably have tabs 106 of appropriately adapted configuration. Upon reading the teachings of this specification, those with ordinary skill in the art will now understand that, under appropriate circumstances, considering such issues as gondola 120 design, display fixture 1003 design, connection element design, economics, and user preference, etc., other connectors, such as pins, pegs, clamps, etc., may suffice.

Preferably, tabs 106 may be configured to interlock with two or more different designs of slotted standards 105 by adapting to common features of the two or more different designs of slotted standards 105. For example, the upper tab 106 may be configured in an upward slope and the bottom tab 106 may be configured in a downward slope such that the display fixture anchor system is inserted into the upper slot 109 on the slotted standard 105 at about a 45-degree angle and then the display fixture anchor system 100 is lifted such that the bottom tab 106 may be inserted into a lower slot 109 and then the display fixture anchor system 100 is dropped down to lock the display fixture anchor system 100 into the slotted standard 105.

Figure 3:
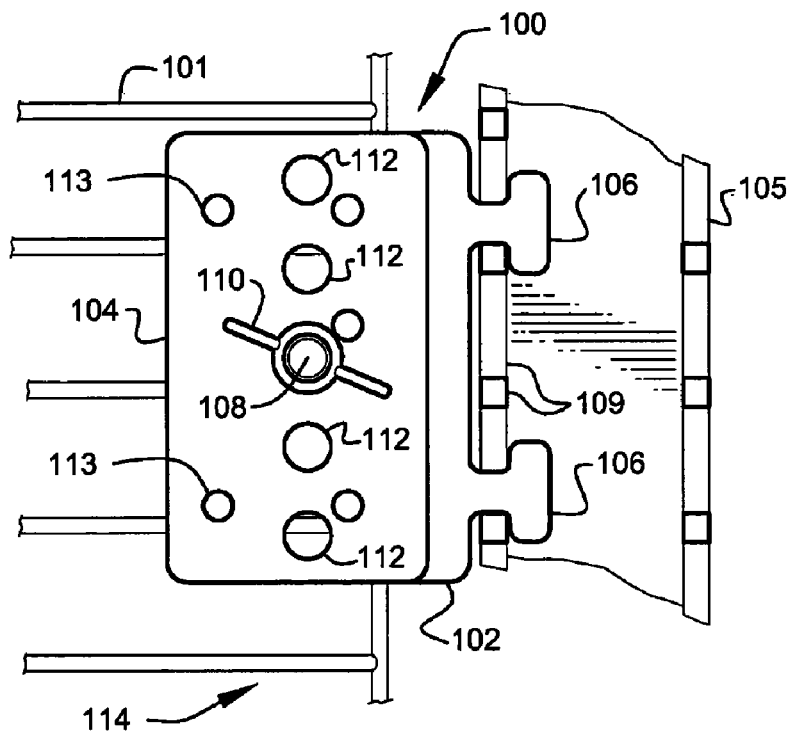
FIG. 3 is a partial cross-sectional view illustrating section 3-3 of FIG. 1A of a standard of the store gondola of FIG. 1A showing the display fixture anchor system of FIG. 1A interlocked therewith, according to a preferred embodiment of the present invention.

FIG. 3 is a partial cross-sectional view of section 3-3 of FIG. 1B of the slotted standard 105 of the store gondola 120 of FIG. 1B showing the display fixture anchor system 100 of FIG. 1B interlocked therewith. Preferably, tabs 106 are symmetrical along a horizontal mid-line to assist in operating in right-side-up or upside-down attitudes. Various manufacturers of predetermined store-shelving units have unique slotted standards 105. Upon reading the teachings of this specification, those with ordinary skill in the art will now understand that, under appropriate circumstances, considering such issues as variations in connection element design, gondola 120 design, display fixture 1003 design, economics, and user preference, etc., various alternate symmetrical tabs 106, such as rounded, triangular, forked, etc., may suffice.

Figure 4:
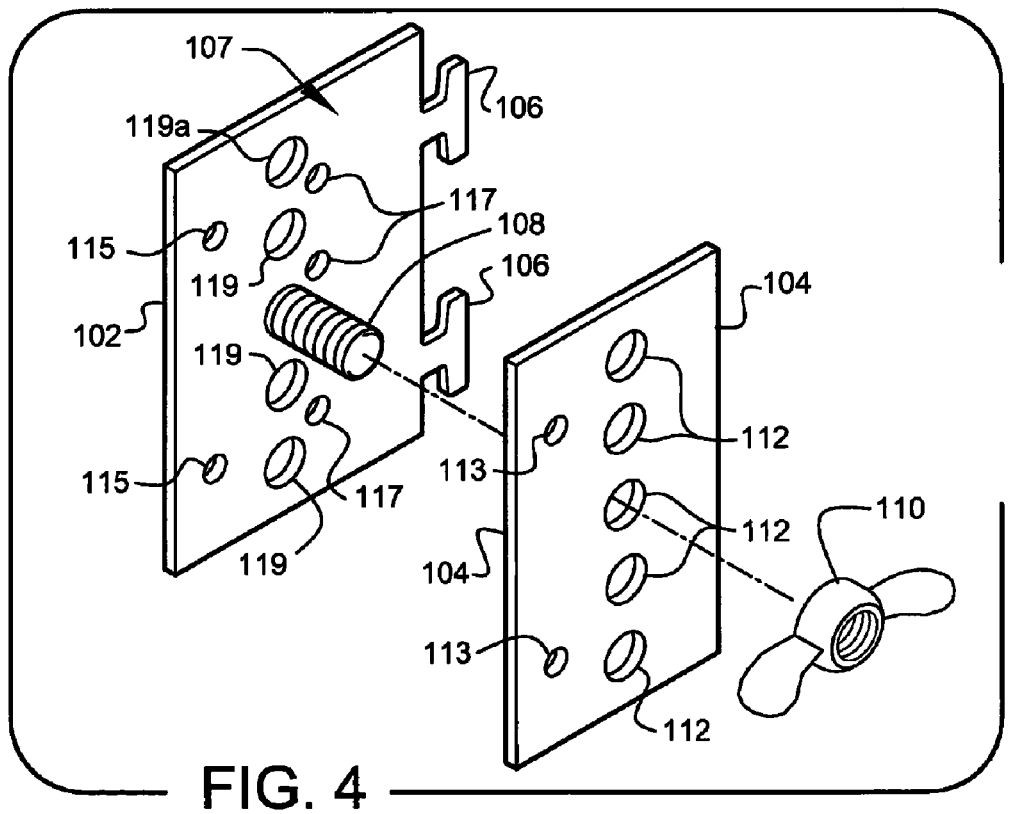
FIG. 4 is an exploded perspective view illustrating a display fixture anchor system, according to the preferred embodiment of FIG. 1B.

FIG. 4 is an exploded perspective view of the display fixture anchor system 100, according to the preferred embodiment of FIG. 1B. First panel 102 has a surface 107 preferably shaped and arranged to abut a substantially vertical web portion 101 of display fixture 1003 (at least embodying herein an abutting surface of said first abutter means; and at least at least embodying herein an abutting surface of said first abutter panel). Preferably, threaded rod 108 is orthogonal to surface 107 of first panel 102, is fixed to first panel 102, and is shaped and arranged to receive wing nut 110. Upon reading the teachings of this specification, those with ordinary skill in the art will now understand that, under appropriate circumstances, considering such issues as safety, convenience, economics, user preference, etc., other extensions, such as bayonet connectors, molly fasteners, snap fittings, etc., may suffice. More preferably, the extension includes a threaded rod 108 and the securer includes a wing nut 110. The location of threaded rod 108 on surface 107 is preferably adapted to specific requirements for particular display fixtures 1003. For example, threaded rod 108 may be located in place of unthreaded aperture 119a on surface 107. Upon reading the teachings of this specification, those with ordinary skill in the art will now understand that, under appropriate circumstances, considering such issues as display fixture 1003 design, convenience, economics, user preference, etc., other locations, such as proximate an edge, threaded bore 115 or 117, unthreaded aperture 119, etc., may suffice.

Preferably, the spacing and arrangement of unthreaded apertures 112 and 119 enables alignment of at least one unthreaded aperture 112 with at least one unthreaded aperture 119 without obstruction by substantially vertical web portion 101 of display fixture 1003 when the display fixture anchor system 100 is installed, as shown. Unobstructed, aligned, unthreaded apertures 112 and 119 may provide access for additional fastening means, such as bolts and nuts or other conventional or customized fasteners (at least embodying herein aligning at least one second aperture of said plurality of substantially equally spaced-apart second apertures with at least one first aperture to receive at least one second fastener for fastening said first abutter panel to said second abutter panel; and at least at least embodying herein aligning at least one second aperture means of said plurality of substantially equally spaced-apart second aperture means with at least one first aperture means to receive second fastener means for fastening said first abutter means to said second abutter means). Various arrangements of unthreaded apertures 112 and 119 preferably enable flexibility of use for the first display fixture anchor system 100. For example, to connect together first and second display fixtures 1003 having substantially vertical web portions 101 of wire grid (instead of anchoring them to a store gondola 120), display fixture anchor system 100 may be rotated ninety angular degrees to partially engage a respective first and second substantially vertical web portion 101 of the first and second display fixture 1003. Second fastening means may then be used, through aligned unthreaded apertures 112 and 119, to fasten the second display fixture 1003 to the first display fixture 1003. In this example, first and second display fixtures 1003 need not be identical. Upon reading the teachings of this specification, those with ordinary skill in the art will now understand that, under appropriate circumstances, considering such issues as display fixture 1003 design, convenience, economics, user preference, etc., other second fasteners, such as setscrews, bayonet connectors, snap fittings, etc., may suffice.

Optionally, second panel 104 comprises one or more threaded bores 113, which may be aligned to threaded bores 115 in first panel 102 (at least at least embodying herein one second threaded bore means for aligning to said first threaded bore means; and at least one second threaded bore alignable to said at least one first threaded bore). Threaded bores 113 and 115 may provide additional means for fastening first panel 102 to second panel 104. Preferably, threaded bores 115 and 117 in first panel 102 are used in another embodiment of a display fixture anchor system 700 (i.e., see FIG. 7, discussed further below) in which first panel 102 is bent into a channel 704 for engaging a tubular perimeter frame member 706 of a tube-framed display fixture 1002 (see FIG. 10). In a preferred system of producing the display fixture anchor system 100, some economy may be achieved by using a single drill template and/or tap rig, or other such device for forming first and second panels 102 and 104, respectively, for all or part of the unthreaded apertures 112 and 119 and threaded bores 113, 115, and 117 in the first and second panels 102 and 104. Accordingly, display fixture anchor system 100 may have unused threaded bores 113, 115 and 117 and unused unthreaded apertures 112 and 119. Upon reading the teachings of this specification, those with ordinary skill in the art will now understand that, under appropriate circumstances, considering such issues as display fixture 1003 design, store gondola 120 design, convenience, economics, user preference, etc., other arrangements of threaded bores and unthreaded apertures, adaptive to various alternate configurations of first panel 102 such as additions, alternate patterns, partial omission, etc., may suffice.

In one aspect of the present invention, threaded rod 108, second panel 104, and securer 110, may collectively be regarded as means for fastening first panel 102 to substantially vertical web portion 101 of display fixture 1003 (at least embodying herein first fastener means for fastening said first abutter means to said substantially vertical portion of said at least one type of display fixture; and at least at least embodying herein a first fastener structured and arranged to fasten said first abutter panel to said substantially vertical portion of said at least one type of display fixture). Preferably, first panel 102 and threaded rod 108 are collectively regarded as a bolt wherein the first panel 102 is the head of the bolt and the tabs 106 are connector elements integral to the head of the bolt and structured and arranged to connect to slotted standard 105, as shown (threaded rod 108 and first panel 102 collectively at least embodying herein a bolt; and a bolt having a head configured to interlock with a store gondola; and at least at least embodying herein a bolt having a head structured and arranged to be capable of interlocking with said store gondola; and at least at least embodying herein a bolt having a head configured to couple to a predetermined apparatus). Preferably, second panel 104 is a washer having at least one unthreaded aperture 112 (at least embodying herein a washer; and at least at least embodying herein a washer having a plurality of apertures each configured to receive said bolt), and wing nut 110 is preferably a nut (at least embodying herein a securer operable to secure first and second abutters to said substantially vertical web portion; and at least at least embodying herein securing means for securing first and second abutter means to said substantially vertical web portion; and at least at least embodying herein at least one second fastener portion interoperable with such first fastener portion to fasten said at least one first panel portion in relationship to such at least one second panel portion). Upon reading the teachings of this specification, those with ordinary skill in the art will now understand that, under appropriate circumstances, considering such issues as connection element design, economics, user preference, etc., other bolt heads, such as those having various couplings adapted to couple to a predetermined apparatus, such as snap fittings, cam-lock pins, screws, etc., may suffice.

FIG. 5 is a side elevation view of a first panel 102 (at least embodying herein a first abutter panel; and at least embodying herein first abutter means) of the display fixture anchor system 100 of FIG. 13, according to a preferred embodiment of the present invention. A preferred arrangement of unthreaded apertures 119, threaded bores 115 and 117, and tabs 106, forms first panel 102, as shown (at least embodying herein a first plurality of spaced-apart first apertures through said first abutter panel; and at least embodying herein at least one first threaded bore through said first abutter panel; and at least embodying herein at least one first connector operable to connect said first abutter panel to one store gondola). Threaded rod 108 is preferably affixed to first panel 102 in display fixture anchor system 100, as shown (at least embodying herein extension affixed to said first abutter panel; and at least embodying herein wherein said extension comprises an orthogonal extension affixed to an abutting surface of said first abutter panel). Preferably, threaded rod 108 is press-fit to first abutter panel 102. Preferably, the first panel 102 is adapted to anchoring display fixtures 1003 having substantially vertical web portions 101 of wire grid to one manufacturer's store gondola 120 or to another display fixture 1003 having substantially vertical web portions 101 of wire grid. Preferably, the size and shape of first panel 102 enables the first panel 102 to abut a plurality of the structural elements, for example wire grid structural elements (at least embodying herein first abutter panel structured and arranged to simultaneously abut at least two said structural elements). Preferably, the arrangement shown is also adapted to connecting to slotted standard 105 various substantially vertical web portions 101 having at least one space or opening for receiving threaded rod 108.

First panel 102 is preferably flat. In some embodiments, first panel 102 may be other than flat. For example, first panel 102 is preferably bent to form display fixture anchor system 700, as discussed below in regard to FIG. 7). For further example, first and second panels 102 and 104 preferably have a shape that conforms to a particular display fixture 1003 (at least embodying herein channel means for abutting said tubular perimeter frame; and at least embodying herein a channel for engaging said tubular perimeter frame). Upon reading the teachings of this specification, those with ordinary skill in the art will now understand that, under appropriate circumstances, considering such issues as display fixture 1003 design, economics, user preference, etc., other abutter panels, such as those having various adaptively concave portions, convex portions, angled portions, etc., may suffice.

Preferably, first panel 102 has three vertically-delineated portions, arbitrarily designated as a left portion 121, a middle portion 122, and a right portion 123, as shown (at least embodying herein a first panel having a left portion, a right portion, and a middle portion disposed between said left portion; and at least embodying herein wherein at least one of said right portion, said left portion and said middle portion have extensions structured and arranged to connect to said store gondola). Preferably, threaded bores 117 are formed in the middle portion 122 and threaded bores 115 are formed in the left portion 121 (at least at least embodying herein one threaded bore said left portion of said first panel). Unthreaded apertures 119 are preferably formed in the middle portion 122 (at least embodying herein a plurality of first substantially equally spaced-apart apertures in said middle portion of said first panel). Threaded bores 117 are preferably not used when first panel 102 is employed as part of display fixture anchor system 100. First panel 102 is preferably manufactured in large batches to be used in both display fixture anchor system 100 and display fixture anchor system 700, display fixture anchor system 800, display fixture anchor system 900, and display fixture anchor system 1200, discussed in more detail below in regard to FIG. 7, FIG. 8, FIG. 9, and FIG. 12, respectively. Preferably, at least one threaded bore 117 and at least one threaded bore 115 are used in display fixture anchor systems 700, 800, 900 and 1200, discussed in more detail below. Upon reading the teachings of this specification, those with ordinary skill in the art will now understand that, under appropriate circumstances, considering such issues as display fixture 1003 design, store gondola 120 design, economics, user preference, etc., other delineations, such as horizontal, diagonal, 2-partition, etc., may suffice.

FIG. 6 is a side elevation view of a second panel 104 of the display fixture anchor system 100 of FIG. 1B, according to a preferred embodiment of the present invention (at least embodying herein second abutter panel structured and arranged to abut an adjacent opposing side of said substantially vertical web portion). Second panel 104 preferably comprises unthreaded apertures 112 and threaded bores 113 arranged adaptively and in complementary fashion to first panel 102 of FIG. 5 (at least embodying herein wherein such second abutter panel further comprises a plurality of second unthreaded apertures; and at least embodying herein a plurality of second substantially equally spaced-apart apertures in a middle portion of said second panel), as shown.

Preferably, the arrangement of unthreaded apertures 112 provides options for installation. For example, if an obstruction on a second side of a substantially vertical web portion 101 prevents the central unthreaded aperture 112 from receiving threaded rod 108 during installation, second panel 104 may be rotated and/or shifted to receive threaded rod 108 in a different unthreaded aperture 112 (at least embodying herein wherein such second abutter panel further comprises at least one second aperture adapted to receive said orthogonal extension). Preferably, threaded bores 113 are used in alignment to threaded bores 115 for additional fastening means (at least embodying herein one second threaded bore alignable to said at least one first threaded bore and operable to receive a third fastener there through). Upon reading the teachings of this specification, those with ordinary skill in the art will now understand that, under appropriate circumstances, considering such issues as display fixture 1003 design, store gondola 120 design, economics, user preference, etc., other patterns of threaded bores 113 and unthreaded apertures 112, such as partial omission, additions, alternate geometric arrangement, etc., may suffice.

FIG. 7 is a perspective view of a display fixture anchor system 700 preferably formed from the first panel 102 of FIG. 5, according to a preferred embodiment of the present invention. Display fixture anchor system 700 is preferably formed from the first panel 102 when the left portion 121 and the right portion 123 are bent to be parallel, mutually opposed, and orthogonal to the middle portion 122, thereby creating channel 704, as shown (at least embodying herein second display fixture anchor system means for abutting said tubular perimeter frame; and at least embodying herein channel means for receiving a portion of said tubular perimeter frame; and at least embodying herein such second display fixture anchor system for abutting said tubular perimeter frame; and at least embodying herein at least one channel for receiving a portion of said tubular perimeter frame, wherein said channel has a selected length). Channel 704 is adapted to receive a portion of tubular perimeter frame member 706 of a tube-framed display fixture 1002 (i.e., see FIG. 10). Preferably, tabs 106 perform the same connecting function as in the display fixture anchor system 100. As a result of the bent configuration of display fixture anchor system 700, threaded bores 115 and 117 are now mutually orthogonal, as shown (at least embodying herein two threaded bore means for receiving said fastener means mutually disposed in a fastening orientation in said channel means; and at least embodying herein at least two threaded bores substantially orthogonally disposed in said channel; and at least embodying herein wherein said fastening orientation comprises a mutually orthogonal orientation).

Preferably, fasteners, such as setscrews 702, may be threaded into threaded bores 115 and 117, as shown, to fasten or secure the display fixture anchor system 700 to the tubular perimeter frame member 706 (at least embodying herein fastener means). Upon reading the teachings of this specification, those with ordinary skill in the art will now understand that, under appropriate circumstances, considering such issues as tubular perimeter frame 706 cross-sectional shape, store gondola 120 design, economics, user preference, etc., other fasteners, such as screws having thumb tabs, bolts, Philips-head screws, etc., may suffice.

FIG. 8 is a perspective view of a display fixture anchor system 800 formed from the first panel 102 of FIG. 5, according to a preferred embodiment of the present invention. Display fixture anchor system 800 is one-half the length of the display fixture anchor system 700 (at least embodying herein wherein said channel means has a selected length; and at least embodying herein wherein said channel has a selected length). Preferably, display fixture anchor system 800 may be used, for example, on a curved portion of a tubular perimeter frame 706 where a display fixture anchor system 700 would be too long to fit on the curved portion. Upon reading the teachings of this specification, those with ordinary skill in the art will now understand that, under appropriate circumstances, considering such issues as display fixture 1002 design, store gondola 120 design, economics, user preference, etc., other lengths of display fixture anchor system 800, such as longer, shorter, curved length, etc., may suffice.

FIG. 9 is a perspective view of a display fixture anchor system 900 formed from first and second display fixture anchor systems 700 of FIG. 7, according to a preferred embodiment of the present invention. Preferably, first and second display fixture anchor systems 700 of display fixture anchor system 900 are connected along seam 904 between respective outer walls thereof, as shown, by any conventional means, i.e., welding (at least embodying herein display fixture anchor system means comprising two said display fixture anchor system means aligned in parallel and affixed along at least a portion of said at least one outer wall of each said second display fixture anchor system means; and at least embodying herein at least one dual second display fixture anchor system comprising two said second display anchor assemblies aligned in parallel and affixed along at least a portion of said at least one outer wall of each said first abutter panel). Preferably, display fixture anchor system 900 is used to mutually connect first and second tube-framed display fixtures 1002, which need not be identical but which have tubular perimeter frames 706. More preferably, display fixture anchor system 900 is used to mutually connect first and second tube-framed display fixtures 1002 having tubular perimeter frames 706 to a store gondola 120. Fastening of the display fixture anchor system 900 to tubular perimeter frames 706 may be achieved by threading setscrews 702 into threaded bores 117 and 115 to engage and secure the tubular perimeter frame members 706. Upon reading the teachings of this specification, those with ordinary skill in the art will now understand that, under appropriate circumstances, considering such issues as display fixture 1002 design, economics, user preference, etc., other combinations to configure display fixture anchor system 900, such as "T"-shaped, "U"-shaped, "L"-shaped, etc., may suffice.

Figure 10:
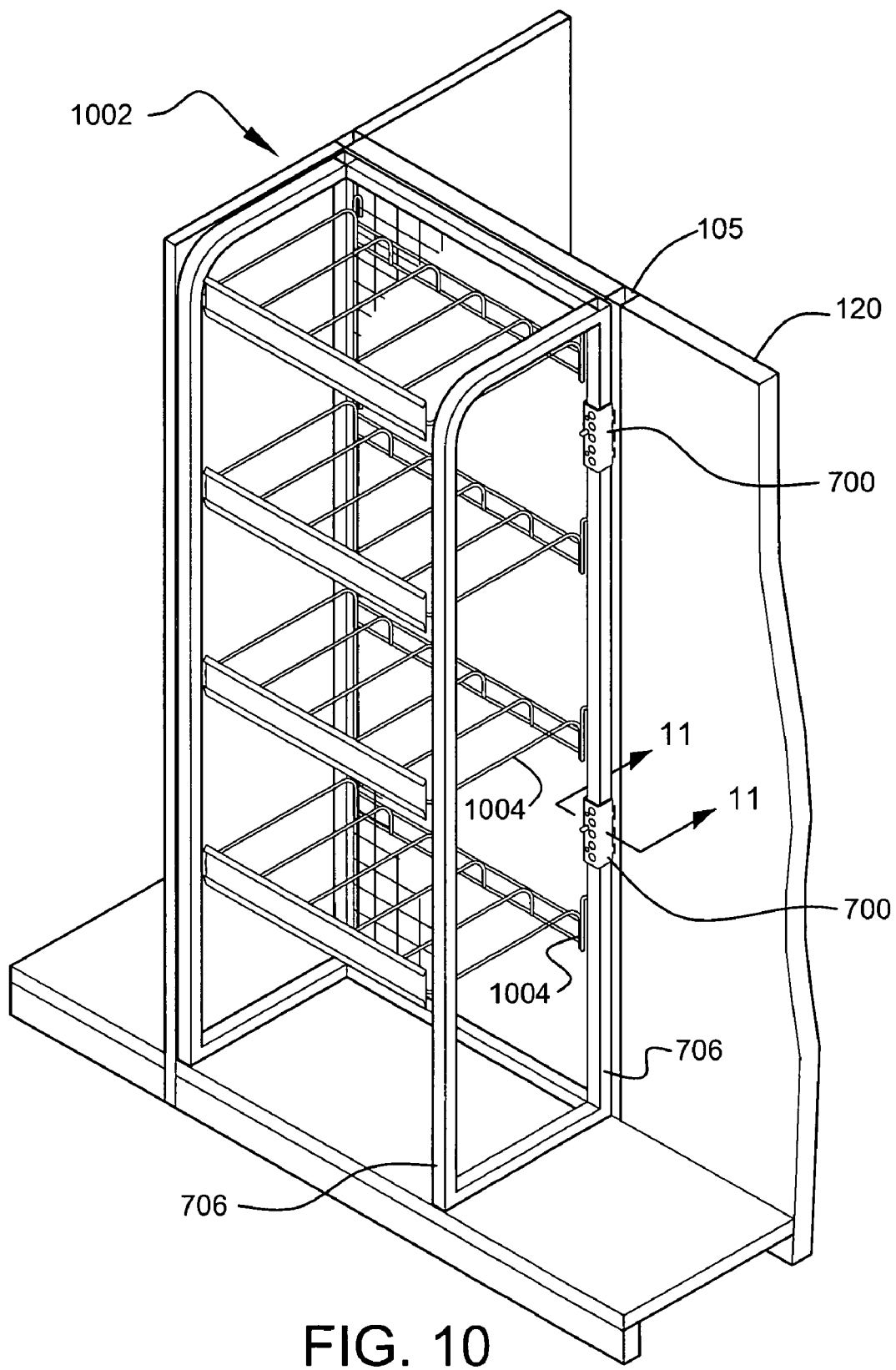
FIG. 10 is a perspective view illustrating a display fixture anchor system of FIG. 9 according to a preferred embodiment of the present invention.

FIG. 10 is a perspective view of a tube-framed display fixture 1002 having a tubular perimeter frame 706 connected to a slotted standard 105 of a store gondola 120 using two display fixture anchor systems 700 of FIG. 7. Preferably, the display fixture anchor systems 700 may be positioned at any points along the tubular perimeter frame 706 where the shelves 1004 provide no obstruction and alignment to the slotted standard 105 is satisfactory. Preferably, one or more second display fixture anchor systems 700 may be used to connect a tube-framed display fixture 1002 to a store gondola 120, as shown. Preferably, the thickness of first panel 102 is complimentary to the width of the tube-framed display fixture 1002 to minimize wasted space within the store gondola 120. FIG. 10 delineates section 11-11 horizontally through a second display fixture anchor system 700, a tubular perimeter frame member 706, standard 105, and a portion of store gondola 120. Upon reading the teachings of this specification, those with ordinary skill in the art will now understand that, under appropriate circumstances, considering such issues as display fixture 1002 design, store gondola 120 design, economics, user preference, etc., other approaches to anchoring, such as using more display fixture anchor systems 700, fewer display fixture anchor systems 700, diagonally opposed display fixture anchor systems 700, horizontally opposed display fixture anchor systems 700, etc., may suffice.

FIG. 11 is a cross-sectional view of section 11-11 of FIG. 10 showing a display fixture anchor system 700 of FIG. 7 connecting a tubular perimeter frame 706 of a tube-framed display fixture 1002 to a slotted standard 105 of a store gondola 120. Setscrew 702b is preferably threaded through threaded bore 117 to engage and secure tubular perimeter frame 706 against store gondola 120, including slotted standard 105. In tightening setscrew 702b, display fixture anchor system 700 will be forced away from standard 105 causing tabs 106 to engage inner wall 109 of standard 105, causing tension in display fixture anchor system 700 and thereby securing tubular perimeter frame 706 to store gondola 120. Setscrew 702a is preferably threaded through threaded bore 115 to engage and secure tubular perimeter frame 706 against right portion 123 of second display fixture anchor system 700. Setscrews 702a and 702b are preferably orthogonally oriented, as shown. Upon reading the teachings of this specification, those with ordinary skill in the art will now understand that, under appropriate circumstances, considering such issues as display fixture 1002 design, store gondola 120 design, various cross-sectional shapes of tubular perimeter frames 706, economics, user preference, etc., other orientations of setscrews, such as obtuse angles, acute angles, diametrically opposed, multiple-plane opposition, etc., may suffice.

FIG. 12 is a cross-sectional view similar to that of section 11-11 of FIG. 10 showing an alternate curved display fixture anchor system 1200 connecting a round tubular perimeter frame 1206 of a tube-framed display fixture 1002 to a standard 105 of an store gondola 120. Display fixture anchor system 1200 merely suggests the wide range of strategies for bending first panel 102 contemplated within the present invention. The bending of first panel 102 to produce display fixture anchor system 1200 is preferably adaptive to the cross-sectional shape of the round tubular perimeter frames 1206, as shown. Preferably, round tubular perimeter frame 1206 may be successfully engaged by second display fixture anchor system 700. Upon reading the teachings of this specification, those with ordinary skill in the art will now understand that, under appropriate circumstances, considering such issues as display fixture 1002 design, store gondola 120 design, tubular perimeter frame 706 cross sectional shape, economics, user preference, etc., other approaches to bending first panel 102 to form display fixture anchor system 700, such as polygonal, multiply arcuate, hybrid, etc., may suffice.

FIG. 13 is a cross-sectional view similar to that of section 11-11 of FIG. 10 showing display fixture anchor system 900 of FIG. 9 connecting two tubular perimeter frames 706a and 706b of two respective tube-framed display fixtures 1002 to a standard 105 of a store gondola 120. Setscrews 702a engage and fasten tubular perimeter frames 706a and 706b together, and setscrews 702b engage tubular perimeter frames 706a and 706b to fasten tabs 106 to connecting element 105 of store gondola 120. Preferably, setscrews 702a can be used to fasten various pairs of various tube-framed display fixtures 1002 together regardless of whether a connection to standard 105 is subsequently made using tabs 106 and setscrews 702b. Upon reading the teachings of this specification, those with ordinary skill in the art will now understand that, under appropriate circumstances, considering such issues as display fixture 1002 design, store gondola 120 design, tubular perimeter frame 706 cross sectional shape, economics, user preference, etc., other approaches to bending first panel 102 to form display fixture anchor system 900, such as polygonal, multiply arcuate, hybrid, etc., may suffice.

Figure 14:
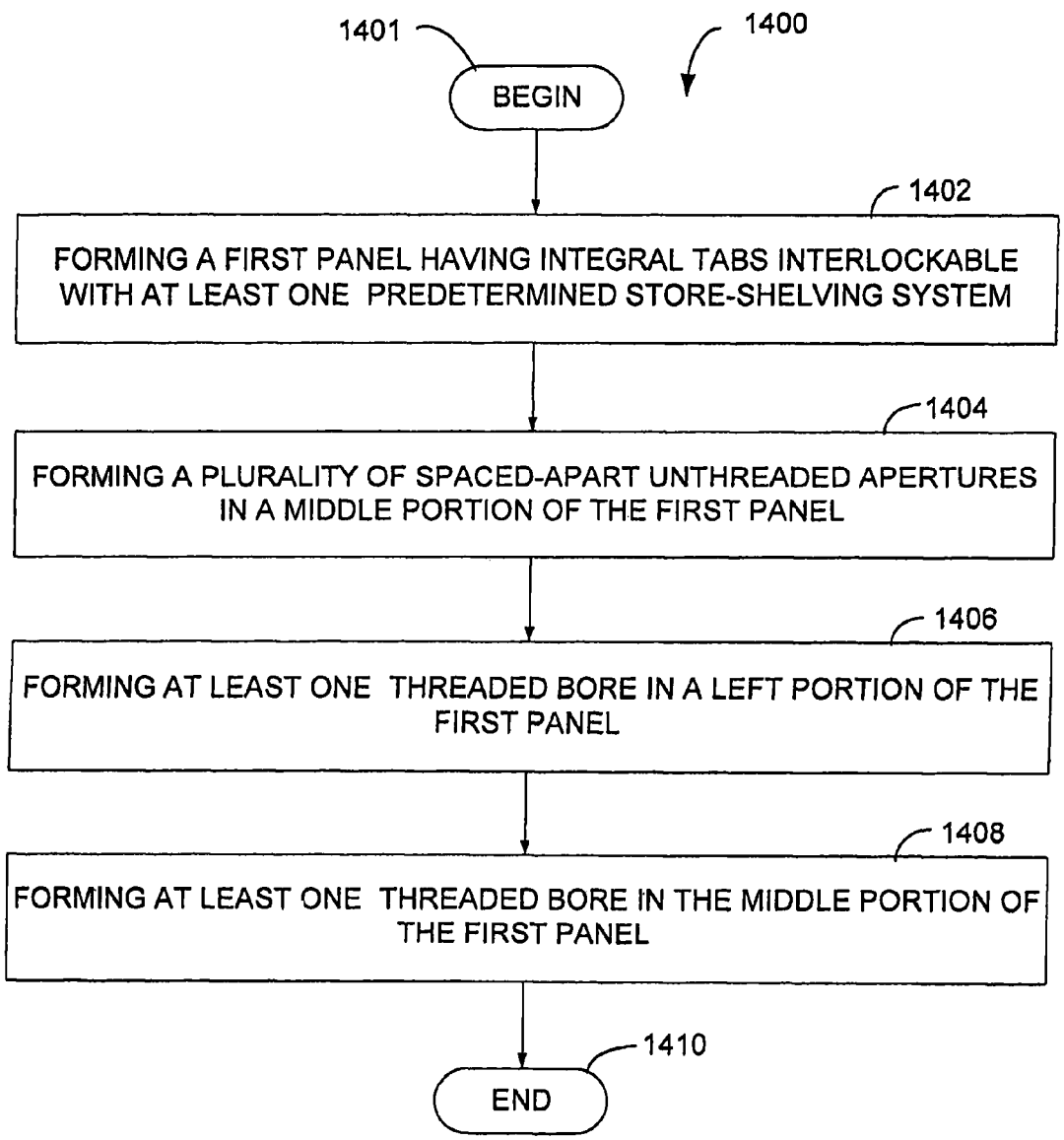
FIG. 14 is a flow chart illustrating a preferred system of making a first panel of the display fixture anchor system of FIG. 5 according to a preferred embodiment of the present invention.

FIG. 14 is a flow chart illustrating a preferred system 1400 of making a first panel 102 of the embodiment of FIG. 5 according to a preferred embodiment of the present invention. The system 1400 begins in step 1401 with a sheet of substantially rigid malleable material that is preferably metal and more preferably steel. Preferably, a blank for first panel 102 is formed in step 1402, preferably by stamping a flat plate from the sheet of steel. Upon reading the teachings of this specification, those with ordinary skill in the art will now understand that, under appropriate circumstances, considering such issues as display fixture 1002 design, store gondola 120 design, economics, user preference, etc., other systems for creating a blank for first panel 102, such as cutting, casting, pressing, etc., may suffice. The blank for first panel 102 is preferably formed in step 1402 with integral tabs 106 on a right side 123 of first panel 102 that are interlockable with a standard 105 of at least one store gondola 1700 (at least embodying herein forming a first panel having a left portion, a right portion, and a middle portion disposed between said left portion and wherein at least one of said right portion, said left portion and said middle portion have extensions structured and arranged to connect to said store gondola). Upon reading the teachings of this specification, those with ordinary skill in the art will now understand that, under appropriate circumstances, considering such issues as store gondola 120 design, slotted standard 105 design, economics, user preference, etc., connectors other than tabs 106, such as pins, pegs, cam-lock pins, etc., may suffice.

Preferably, in step 1404, a plurality of spaced-apart unthreaded apertures 119 is formed in a middle portion 122 of a blank for first panel 102. The apertures 119 are preferably equally spaced apart and, more preferably, the apertures 119 are spaced apart by an amount having a functional relationship with spacing between openings in substantially vertical web 101, to allow at least one aperture 119 to align with at least one opening in web 101. Most preferably, the spacing apart of the apertures 119 forms a geometric pattern that ensures at least one aperture 119 can be aligned to at least one opening in web 101 (at least embodying herein forming a plurality of first substantially equally spaced-apart apertures in said middle portion of said first panel). Preferably, apertures 119 are formed by stamping contemporaneously with step 1402. Upon reading the teachings of this specification, those with ordinary skill in the art will now understand that, under appropriate circumstances, considering such issues as display fixture 1002 design, economics, user preference, etc., other patterns of apertures 119, such as asymmetrical, matrixed, radially symmetrical, etc., may suffice.

Preferably, in step 1406, at least one threaded bore 115, and more preferably two threaded bores 115, are formed in the left portion 121 of the blank for first panel 102 (at least embodying herein forming at least one threaded bore in said left portion of said first panel). Preferably, threaded bore 115 is formed by a two-step system of stamping a bore contemporaneously with steps 1402 and 1404 and tapping threads into threaded bore 115 in step 1406. Upon reading the teachings of this specification, those with ordinary skill in the art will now understand that, under appropriate circumstances, considering such issues as display fixture 1002 design, economics, user preference, etc., other systems for threaded bore 115, such as drilling and tapping, combining steps with step 1406, etc., may suffice.

Preferably, at least one threaded bore 117, and more preferably two threaded bores 117, are formed in the middle portion 122 of the blank for first panel 102 during step 1408 (at least embodying herein forming at least one threaded bore in the middle portion of the first panel. Threaded bores 117 are preferably made in the same manner and to the same specifications as threaded bores 115. First panel 102 is mechanically complete in step 1410. Upon reading the teachings of this specification, those with ordinary skill in the art will now understand that, under appropriate circumstances, considering such issues as display fixture 1002 design, economics, user preference, etc., other systems for forming first panel 102, such as by rearrangement of the sequence of steps 1404, 1406, and 1408, combining same into a single step, varying the size of the plurality of unthreaded apertures 115, etc., may suffice.

Figure 15:
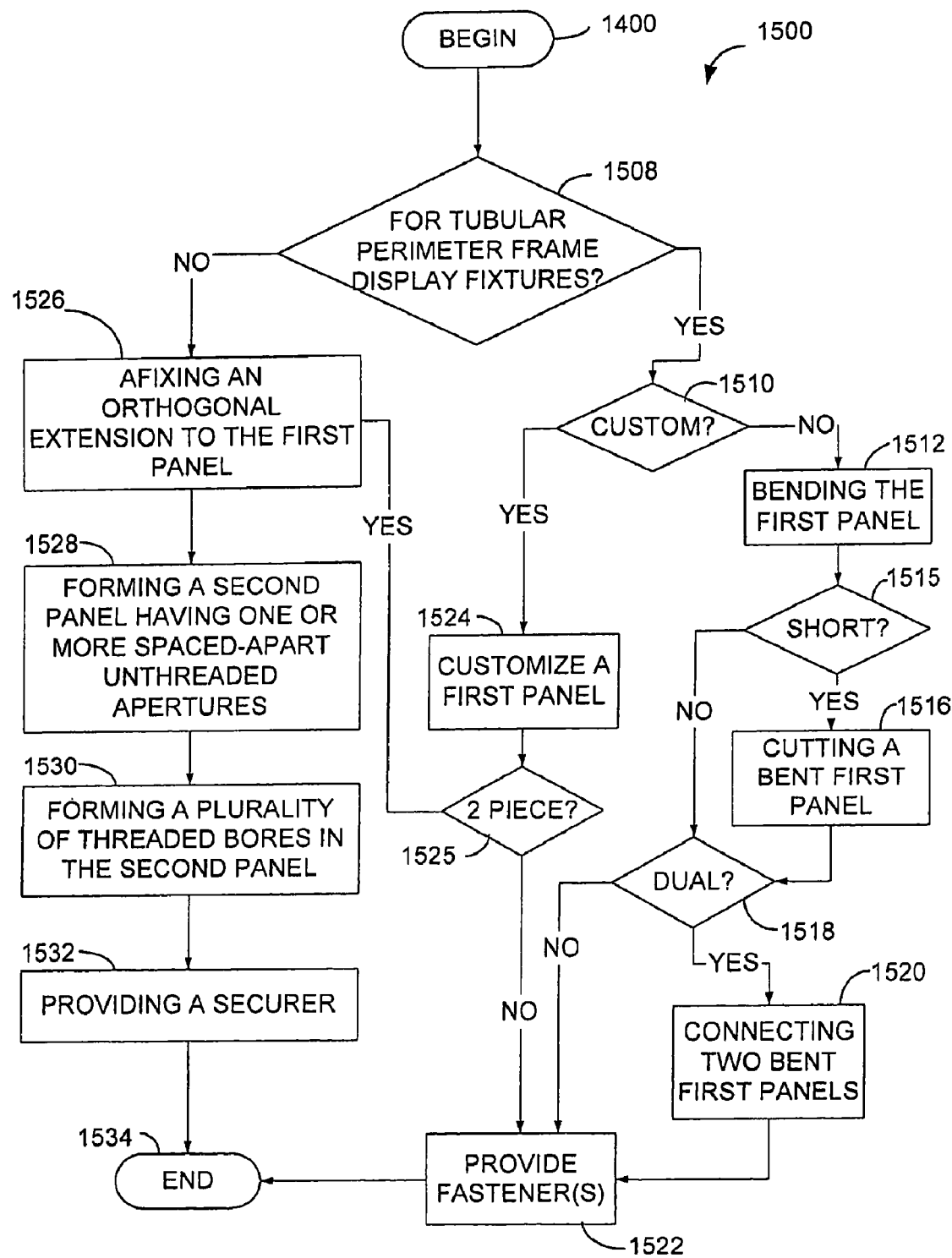
FIG. 15 is a flow chart illustrating a preferred system of making display anchor assemblies of FIG. 1B through FIG. 4 and FIG. 7 through FIG. 13 according to a preferred embodiment of the present invention.

FIG. 15 is a flow chart illustrating a preferred system 1500 of making embodiments of display fixture anchor systems 100, 700, 800, 900, and 1200 of FIGS. one through four (1-4) and FIGS. seven through thirteen (7-13) according to preferred embodiments of the present invention. Preferably, the system 1500 begins with system 1400 of forming a first panel 102. A determination is made in step 1508 to make either a display fixture anchor system (700, 800, 900, and 1200) adapted for tube-framed display fixtures 1002 having tubular perimeter frames 706 or a display fixture anchor system 100 for display fixtures 1003 having substantially vertical web portion 101. Essentially, the determination of step 1508 is made based upon whether or not a bent first panel 102 is needed.

If a determination is made in step 1508 that a bent first panel 102 is required, a determination is next made in step 1510 as to whether or not a custom display fixture anchor system is desired. If a determination is made in step 1510 that a custom display fixture anchor system is desired, the first panel 102 may be bent or otherwise customized (i.e., drilled, tapped, stamped, cut, etc.) in step 1524 (at least embodying herein the step of bending said first panel). If the custom display fixture anchor system is determined in step 1525 to be a two-panel custom display fixture anchor system, similar to embodiment 100, system 1500 proceeds with step 1526 that will be discussed in more detail below. If the custom display fixture anchor system is determined in step 1525 to not be a two-panel custom display fixture anchor system, fasteners, such as setscrews 702 are provided to complete the custom display fixture anchor system (at least embodying herein a first fastener structured and arranged to fasten said first abutter panel to said substantially vertical portion of said at least one type of display fixture). System 1500 ends in step 1534 with a single-panel, custom display fixture anchor system.

If the determination of step 1510 is that a custom display fixture anchor system is not desired, standard bending is accomplished in step 1512. To form display fixture anchor systems 700, 800, and 900, it is preferable to make two bends at right angles to the middle portion 122 of first panel 102, and more preferable to make them contemporaneously (at least embodying herein the step of bending the right portion of said first panel substantially orthogonal to said middle portion of said first panel; and also embodying the step of bending said left portion of said first panel substantially orthogonal to said middle portion of said first panel). Display fixture anchor system 1200 requires a single continuous bend covering middle portion 122, the left portion 121 of first panel 102, and a portion of the right portion 123. Bending 1512 may be conventionally performed using machines as known in the art of metalworking. Preferably, bending steps 1512 are adaptive to tubular perimeter frame 706 cross-sectional shape.

If step 1512 determines that the first panel 102 is not to be customized, a determination is preferably made in step 1515 as to whether a short version, such as display fixture anchor system 800, is to be produced. Preferably, a first panel 102 may be shortened before bending step 1512. More preferably, a first panel 102 may be shortened after bending step 1512 in step 1516. Preferably, a determination is made in step 1518 as to whether a display fixture anchor system 900 is desired. If the determination is made in step 1518 that a display fixture anchor system 900 is desired, two bent first panels 102, or two display fixture anchor systems 700 or 800, are preferably connected in step 1520. Connection 1520 may be accomplished by any convention means, such as welding, spot welding, or fastening. Once the connection 1520 is performed, fasteners, such as setscrews 702, are provided in step 1522 to complete the display fixture anchor system 900.

If the determination is made in step 1518 that a display fixture anchor system 900 is not desired, fasteners, such as setscrews 702, are provided in step 1522 to complete the display fixture anchor system 700. Method 1500 ends in step 1534 with a bent single-panel display fixture anchor system 700.

Preferably, for two-panel display fixture anchor assemblies such as embodiment 100 and some custom display fixture anchor systems, have an orthogonal threaded rod 108 affixed in step 1526 (at least embodying herein the step of forming at least one stud extending orthogonally from said first panel). Preferably, orthogonal threaded rod 108 may be affixed to first panel 102 by welding to surface 107. Upon reading the teachings of this specification, those with ordinary skill in the art will now understand that, under appropriate circumstances, considering such issues as display fixture 1002 design, tubular perimeter frame 706 cross sectional shape, economics, user preference, etc., other systems for forming orthogonal threaded rod 108, such as screwing, dieing, or casting, etc., may suffice for step 1526. The result of step 1526 is a first panel 102 having an orthogonal threaded rod 108 affixed thereto.

Preferably, a second panel 104 is formed in step 1528 in the same manner as first panel 102 is formed, including the formation of one or more unthreaded apertures 112 (at least embodying herein forming a second panel and also embodying forming a plurality of second substantially equally spaced-apart apertures). Apertures 112 preferably are formed the same way, and preferably using the same equipment, as apertures 119. More preferably, apertures 112 are spaced apart with the same spacing as apertures 119. Most preferably, apertures 112 have the same geometric arrangement as apertures 119.

Preferably, a second panel 104 is formed in step 1530 having one or more threaded bores 113. Threaded bores 113 preferably are formed the same way, and using the same equipment, as threaded bores 115. More preferably, threaded bores 113 are spaced apart with the same spacing as threaded bores 115. Most preferably, apertures 113 have the same, geometric arrangement as apertures 115.

Figure 16:
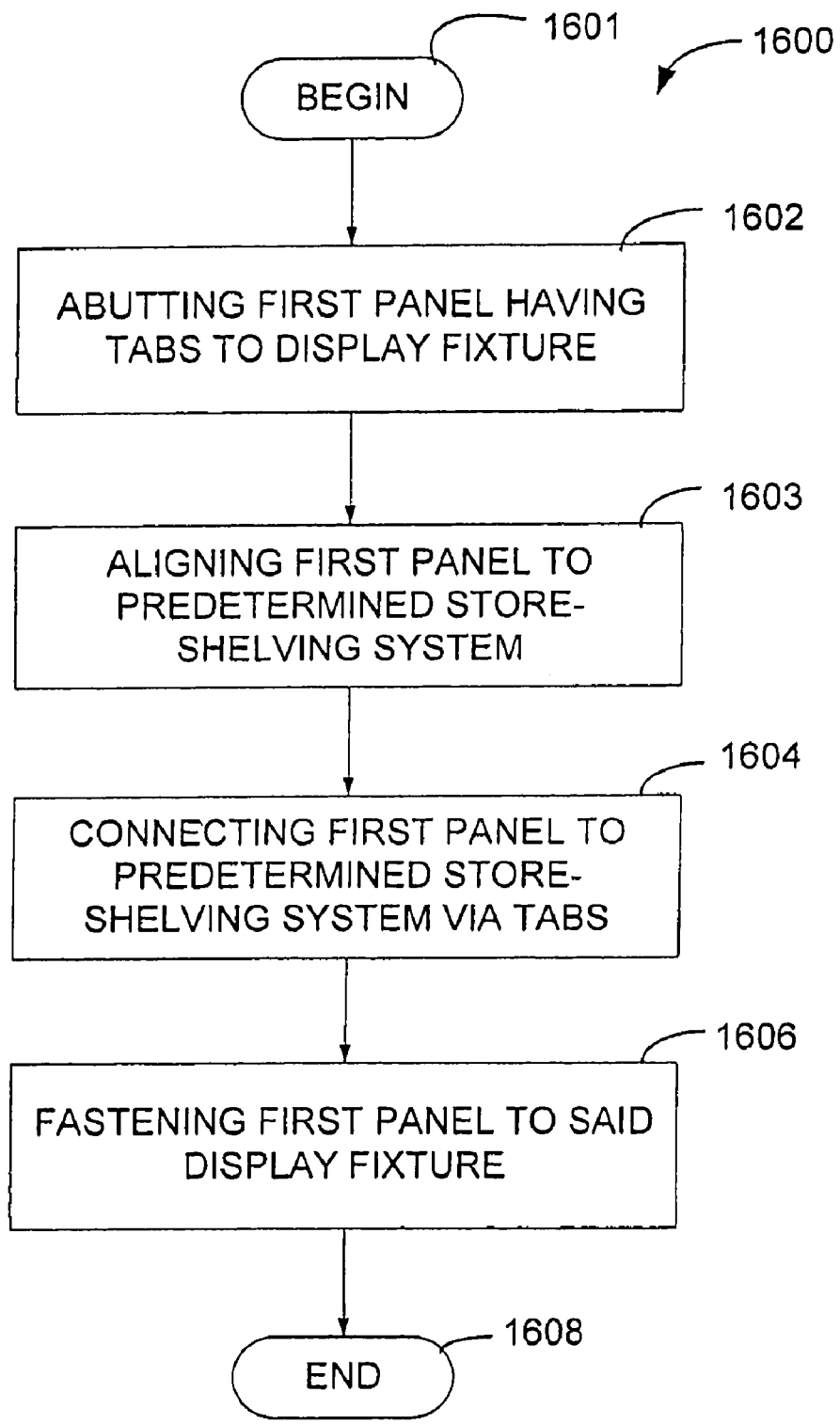
FIG. 16 is a flow chart illustrating a preferred system of using display anchor assemblies of FIG. 1B through FIG. 4 and FIG. 7 through FIG. 13 according to a preferred embodiment of the present invention.

Preferably, a securer, such as wing nut 110 is provided in step 1532 to complete the display fixture anchor system 100 or a custom display fixture anchor system. The securer 110 provided 1532 is adapted to the orthogonal stud, or threaded rod 108, for securing the second panel 104 and the first panel 102 to the substantially vertical web portion 101 (at least embodying herein the step of providing a securer adapted to interoperate with said stud). Process 1500 ends at step 1534 with a complete display fixture anchor system 100 or a custom display fixture anchor system. Upon reading the teachings of this specification, those with ordinary skill in the art will now understand that, under appropriate circumstances, considering such issues as display fixture 1002 design, economics, user preference, etc., other systems for forming display fixture anchor systems, such as by rearrangement of the sequence of steps, combining two or more steps into a single step, varying the size of the pluralities of unthreaded apertures 115 and threaded bores 113 etc., may suffice. Display fixture anchor system 1500 produces display fixture anchor systems 100, 700, 800, 900, 1200, and custom display fixture anchor systems (at least embodying herein display fixture anchor system produced by the steps according to claim 18). FIG. 16 is a flow chart illustrating a preferred system 1600 of using embodiments of display anchor assemblies 100, 700, 800, 900, and 1200 of FIGS. one through four (1-4) and FIGS. seven through thirteen (7-13) according to a preferred embodiment of the present invention. System 1600 begins 1601 with a display fixture anchor system 100, 700, 800, 900, 1200 or custom display fixture anchor system at hand. The first panel 102 of system display fixture anchor system 100, 700, 800, 900, 1200 or custom display fixture anchor system is preferably abutted 1602 to a vertical web portion 101 of the display fixture 1003 or vertical portion of tubular perimeter frame 706 of tube-framed display fixture 1002 (at least embodying herein abutting said at least one first panel portion in a substantially vertical position to at least one vertical portion of at least one display fixture). Display anchor assemblies 100 and perhaps one or more custom display fixture anchor systems are preferably abutted against a substantially vertical web portion 101 of display fixture 1003 such that orthogonal threaded rod 108 extends through an opening in web 101. Display fixture anchor systems 700, 800, 900 and perhaps one or more custom display fixture anchor systems are preferably abutted against a substantially vertical portion of a tubular perimeter frame 706 of tube-framed display fixture 1002. In the abutted position, first panel 102 is preferably aligned 1603 with a vertical sliding motion to align 1603 tabs 106 to the standard 105 of store gondola 120, as shown (at least embodying herein aligning said at least one first panel to at least one connection element of said store gondola). First panel 102 is then preferably connected 1604 via tabs 106 to the slotted standard 105 of store gondola 120, as shown (at least embodying herein connecting such at least one display fixture to said store gondola using said integral connectors of said at least one such first panel).

First panel 102 is preferably fastened 1606 to said display fixture 1003 or tube-framed display fixture 1002 (at least embodying herein fastening said at least one first panel to said at least one vertical portion of said display fixture). First panels 102 of display anchor assemblies 100 and perhaps one or more custom display fixture anchor systems are preferably fastened 1606 by receiving an aperture 112 of second panel 104 on orthogonal threaded rod 108 with second panel 104 abutted to an adjacent opposing surface of the substantially vertical web 101, and securing second panel 104 in place with a securer, such as wing nut 110. First panels 102 of display anchor assemblies 700, 800, 900, 1200 and perhaps one or more custom display fixture anchor systems are preferably fastened 1606 by tightening orthogonally-oriented pairs of setscrews 702 in threaded bores 113 and 115 to engage and fasten 1606 tubular perimeter frame 706 in channel 704 of display anchor assemblies 700, 800, 900, 1200 and perhaps one or more custom display fixture anchor systems. System 1600 ends in step 1608 with a display fixture anchor system 100, 700, 800, 900, 1200 or one or more custom display fixture anchor systems fastened to a vertical portion 101 or 706 of a display fixture 1003 or tube-framed display fixture 1002 and connected to a standard 105 of a predetermined store-shelving fixture 120. Upon reading the teachings of this specification, those with ordinary skill in the art will now understand that, under appropriate circumstances, considering such issues as display fixture 1002 design, store gondola 120 design, economics, user preference, etc., other systems for using display fixture anchor systems, such as by rearrangement of the sequence of steps, combining two or more steps into a single step, separating a particular step into a plurality of steps, etc., may suffice.

Figure 17:
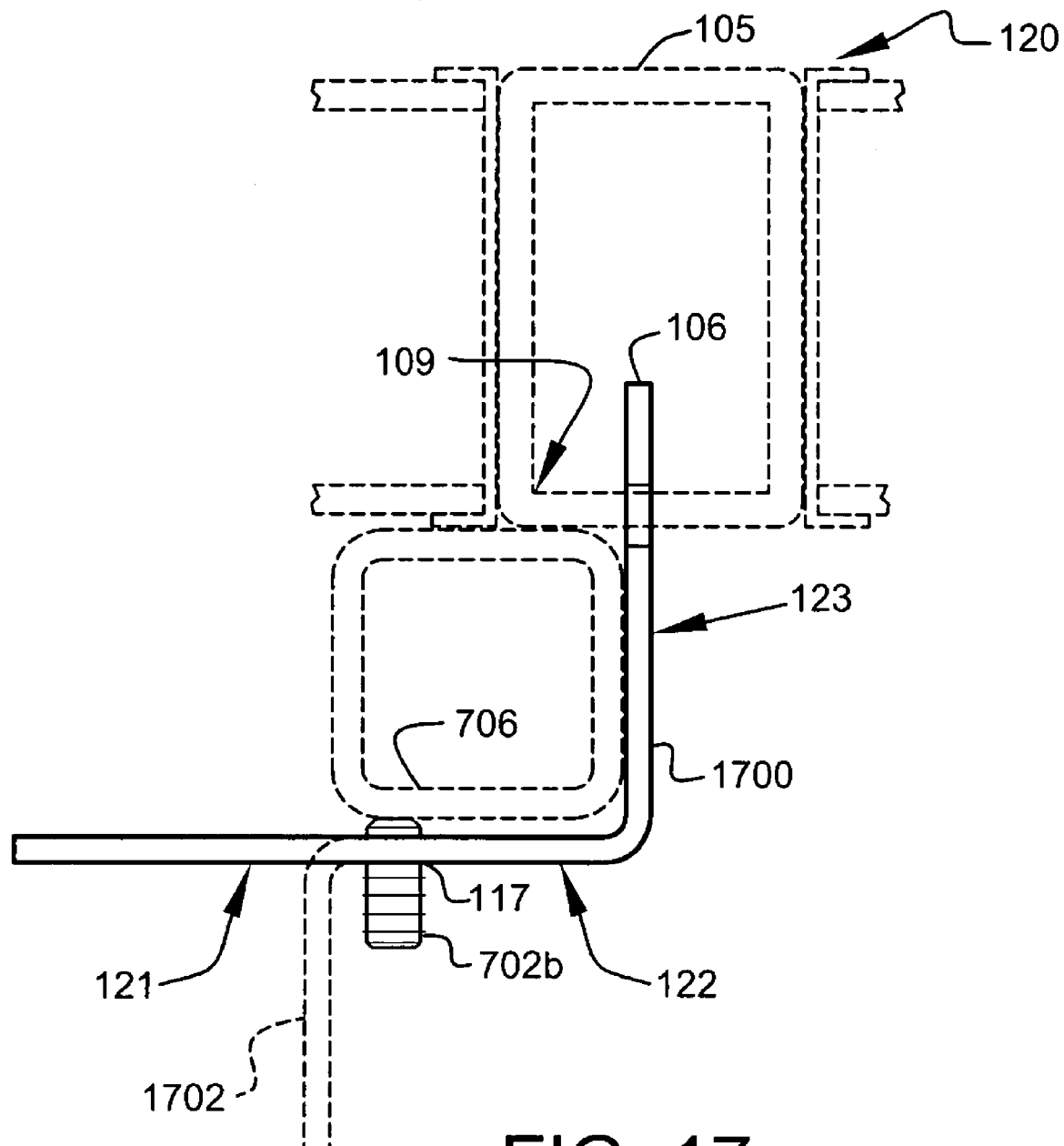
FIG. 17 is a cross-sectional view of similar to that of section 11-11 of FIG. 10 illustrating a particular custom display fixture anchor system according to a preferred embodiment of the present invention.

FIG. 17 is a cross-sectional view similar to that of section 11-11 of FIG. 10 illustrating a particular custom display fixture anchor system 1700 according to a preferred embodiment of the present invention. Preferably, display fixture anchor system 1700 comprises a first panel 102 having a single bend between right portion 123 and combined middle portion 122 and left portion 121, as shown (at least embodying herein wherein said first abutter panel comprises a middle portion aligned generally perpendicularly to said right portion and said first abutter panel comprises a left portion aligned one of generally co-linearly to said middle portion). Preferably, the right portion 123 is sized by bending relative to one or more sizes of tubular perimeter frame 706, as shown (at least embodying herein wherein first abutter panel further comprises one right portion sized adaptively to one or more sizes of tubular perimeter frame). More preferably, panel 102 has a short length, such as that shown in FIG. 8 (at least embodying herein wherein such first abutter panel comprises at least one selected length). Preferably, first abutter panel 102 is fastened to tubular perimeter frame 706 using setscrew 702b, as shown (at least embodying herein said at least one first fastener comprises at least one setscrew). It is noted that display fixture anchor system 1700 is preferably used to anchor both right-side and left side portions of tubular perimeter frame 706. In an alternate embodiment 1702, left portion 121 is bent in a direction relative to middle portion 122 opposite that of the right portion 123, as shown (at least embodying herein left portion 121 being bent generally perpendicularly to said middle portion in a direction opposite that of said right portion). Upon reading the teachings of this specification, those with ordinary skill in the art will now understand that, under appropriate circumstances, considering such issues as display fixture 1002 design, store gondola 120 design, economics, user preference, etc., other custom display fixture anchor systems, such as those with more adaptive bends, different first fasteners, various lengths etc., may suffice.

It is noted that the preferred dimensions of each display fixture anchor system are adaptive to requirements for human manipulation, display fixture structural design and dimensions thereof, store gondola structural design and dimension, and interrelationships there between. Preferably, the size of the rectangular portion of first abutter panel 102 used for a Lozier® store gondola 120 is about two-and-three-eights inches by about three-and-one-quarter inches. Preferably tabs 106 used for a Lozier® store gondola 120 have a height of about eleven-sixteenths of an inch and extend about seven-eighths of an inch from the rectangular portion of abutter panel 102. For example, the combination of display fixture 1003 length and first panel 102 thickness is preferably an integer divisor of the length of the store gondola 120.

Preferably, first and second abutter panels 102, 104 are about one-sixteenth-inch thick. For further example, the spacing between apertures 112 and 119 is preferably adapted to standard wire grid dimensions on one or more display fixtures 1003 to ensure an opportunity for a second fastener, as shown in FIG. 3. Preferably, the spacing between apertures 112 and between apertures 119 is about one-quarter of an inch. For yet further example, threaded bore 117 is preferably located in middle portion 122 to permit a setscrew to engage a point on a smallest standard tubular perimeter frame 706 farthest away from right portion 123 so that, when a first abutter panel 102 is bent to adapt to a next larger standard tubular perimeter frame 706, the set screw 702b will still engage the same face of the tubular perimeter frame 706, as shown in FIG. 11. Preferably, at least one threaded bore 117 is aligned to each line of symmetry of tabs 106 and are offset from the right edge of the rectangular portion of first panel 102 by about one-and-one-quarter inches. Preferably, threaded bores 113, 115, and 117 have a diameter of about seven sixteenths of an inch. Preferably, threaded bores 115 are aligned to each line of symmetry of tabs 106 and are offset from the left edge of the rectangular portion of first panel 102 by about one-quarter of an inch. Preferably, second abutter panel 104 has apertures 112 and threaded bores 113 sized and arranged substantially the same as apertures 119 and threaded bores 115. Preferably, the dimensions of the second abutter panel are two inches by three-and-one-quarter inches by one-sixteenth of an inch.

Upon reading the teachings of this specification, those with ordinary skill in the art will now understand that, under appropriate circumstances, considering such issues as economics, user preference, specific use requirements, etc., other dimensions and arrangements, for example, bending the flat plate, increasing or decreasing aperture size, increasing or decreasing abutter plate size, etc., may suffice.

Although applicant has described applicant's preferred embodiments of this invention, it will be understood that the broadest scope of this invention includes such modifications as diverse shapes, sizes, and materials. Such scope is limited only by the claims below as read in connection with the above specification.

Further, many other advantages of applicant's invention will be apparent to those skilled in the art from the above descriptions and the below claims.

What is claimed is:

1. A display fixture anchoring system relating to connecting at least one display fixture, having at least one substantially vertical portion, to at least one store gondola, the at least one store gondola having a plurality of slots, the display fixture anchoring system comprising:
   a) at least one first abutter panel structured and arranged to at least partially abut the at least one substantially vertical portion of the at least one display fixture;
   b) wherein said at least one first abutter panel comprises
      i) at least one extension member fixed to and extending orthogonally from a plane of an inside surface of said at least one first abutter panel,
      ii) a first plurality of spaced-apart through apertures extending through said at least one first abutter panel from said inside surface to an outside surface of said at least one first abutter panel, and
      iii) at least one tab extending outwardly from at least one side edge separating said inside surface from said outside surface of said at least one first abutter panel, the at least one tab being orthogonal with respect to the at least one extension member,
      iv) wherein said at least one tab is structured and arranged to connect with at least one slot of the at least one store gondola;
   c) at least one second abutter panel structured and arranged to at least partially abut the at least one substantially vertical portion of the at least one display fixture;
   d) wherein said at least one second abutter panel comprises
      i) at least one second plurality of spaced-apart apertures through said at least one second abutter panel,
      ii) wherein each aperture of said second plurality of spaced-apart apertures are each sized to receive said at least one extension member of said at least one first abutter panel;
   e) at least one fastener to fasten said at least one first abutter panel to said at least one second abutter panel with the at least one substantially vertical portion of the at least one display fixture therebetween.

2. The display fixture anchoring system according to claim 1 wherein said at least one first abutter panel and said at least one second abutter panel may be selectively positioned and fastened at any desired point along at least one substantially vertical portion of at least one display fixture.

3. The display fixture anchoring system according to claim 1 wherein said at least one tab is T-shaped.

4. The display fixture anchoring system according to claim 1 wherein said at least one first abutter panel comprises exactly two tabs extending outwardly from at least one side portion of said at least one first abutter panel.

5. The display fixture anchoring system according to claim 1 wherein said at least one extension member comprises at least one rod.

6. The display fixture anchoring system according to claim 5 wherein said at least one at least one rod is threaded.

7. The display fixture anchoring system according to claim 1 wherein said at least one fastener may be secured with said at least one extension member by hand without the use of special purpose tools.

8. The display fixture anchoring system according to claim 1 wherein said at least one first abutter panel further comprises at least one first threaded bore through said at least one first abutter panel.

9. The display fixture anchoring system according to claim 8 wherein said at least one second abutter panel further comprises at least one second threaded bore through said at least one second abutter panel.

10. The display fixture anchoring system according to claim 9 wherein said at least one first threaded bore and said at least one second threaded bore are positioned on its respective at least one abutter panel in a complementary manner.

11. The display fixture anchoring system according to claim 1, further comprising the at least one display fixture.

12. The display fixture anchoring system according to claim 1, further comprising the at least one store gondola.

13. The display fixture anchor system according to claim 1, wherein said at least one first abutter panel is structured and arranged to simultaneously abut, when installed, at least two structural elements of at least one vertical web portion of at least one display fixture.

* * * * *